(12) United States Patent
Miki

(10) Patent No.: US 10,431,187 B2
(45) Date of Patent: Oct. 1, 2019

(54) TERMINAL APPARATUS, SCREEN RECORDING METHOD, PROGRAM, AND INFORMATION PROCESSING SYSTEM

(71) Applicant: Morio Miki, Kanagawa (JP)

(72) Inventor: Morio Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 15/161,564

(22) Filed: May 23, 2016

(65) Prior Publication Data

US 2016/0379597 A1 Dec. 29, 2016

(30) Foreign Application Priority Data

Jun. 29, 2015 (JP) .................................. 2015-130278
Nov. 12, 2015 (JP) .................................. 2015-222331

(51) Int. Cl.
*G09G 5/12* (2006.01)
*G06F 3/14* (2006.01)
*H04L 12/18* (2006.01)
*H04L 29/06* (2006.01)

(52) U.S. Cl.
CPC ............. *G09G 5/12* (2013.01); *G06F 3/1454* (2013.01); *H04L 12/1813* (2013.01); *H04L 12/1818* (2013.01); *H04L 65/403* (2013.01); *H04L 65/4015* (2013.01); *G09G 2370/025* (2013.01)

(58) Field of Classification Search
CPC .................................................. H04L 12/1831
See application file for complete search history.

(56) References Cited

U.S. PATENT DOCUMENTS

| | | | | |
|---|---|---|---|---|
| 6,952,660 B1* | 10/2005 | Matheson | .............. | G06Q 10/10 703/1 |
| 6,959,075 B2* | 10/2005 | Cutaia | .............. | H04M 3/42221 370/260 |
| 7,184,940 B2* | 2/2007 | Matheson | .............. | G06Q 10/10 703/1 |
| 7,203,755 B2* | 4/2007 | Zhu | ........................ | G06Q 10/10 709/204 |
| 7,213,051 B2* | 5/2007 | Zhu | ..................... | H04L 12/1831 709/204 |
| 7,248,684 B2* | 7/2007 | Caspi | .................. | H04L 12/1831 379/202.01 |

(Continued)

FOREIGN PATENT DOCUMENTS

JP 2014-219807 11/2014

*Primary Examiner* — Scott T Baderman
*Assistant Examiner* — Benjamin Smith
(74) *Attorney, Agent, or Firm* — IPUSA, PLLC

(57) ABSTRACT

A terminal apparatus of switching over a first mode, in which a first screen being in synchronization with another terminal apparatus is displayed, and second mode, in which a second screen being in desynchronization with the another terminal apparatus is displayed, upon a mode switchover operation by an operator includes a processor receiving a mode switchover operation between the first mode and the second mode by the operator and display the first screen or the second screen, which is switched over by the mode switchover operation; and receiving a screen recording operation by the operator and record the first or second screen for each of the first and second modes regardless of the display of the first screen or the second screen by the screen display input unit.

9 Claims, 32 Drawing Sheets

| PICTURE RECORDING ID | AGENDA ID | PICTURE RECORDING USER | MEETING ID | PICTURE RECORDING START TIME | PICTURE RECORDING END TIME | TYPE | PICTURE RECORDING DATA |
|---|---|---|---|---|---|---|---|
| 100 | AAA | BB | 1 | 2015/9/1 10:10 | 2015/9/1 10:50 | SHARED | 100.mov |
| 101 | BBB | CC | 1 | 2015/9/1 10:00 | 2015/9/1 11:30 | INDIVIDUAL | 101.mov |
| 102 | XYZ | CC | 2 | 2015/9/2 12:00 | 2015/9/2 13:00 | SHARED | 102.mov |

(56) References Cited

U.S. PATENT DOCUMENTS

| | | | | |
|---|---|---|---|---|
| 7,313,595 B2* | 12/2007 | Rust | H04L 29/06 | 709/204 |
| 7,349,944 B2* | 3/2008 | Vernon | H04L 29/06027 | 709/204 |
| 7,461,347 B2* | 12/2008 | Zhu | H04L 67/10 | 715/751 |
| 7,464,137 B2* | 12/2008 | Zhu | H04L 12/1831 | 709/204 |
| 7,590,230 B1* | 9/2009 | Surazski | H04M 3/561 | 379/158 |
| 7,593,514 B1* | 9/2009 | Zhuang | H04M 7/0045 | 370/352 |
| 7,945,621 B2* | 5/2011 | Yuan | H04L 67/22 | 379/202.01 |
| 8,095,595 B2* | 1/2012 | Bobbitt | H04L 12/1831 | 709/204 |
| 8,121,277 B2* | 2/2012 | Baird | H04L 12/1831 | 370/260 |
| 8,253,771 B2* | 8/2012 | Lammers | H04N 7/147 | 348/14.01 |
| 8,280,962 B2* | 10/2012 | Muniz | H04M 1/72547 | 709/204 |
| 8,312,081 B2* | 11/2012 | Yuan | H04L 67/22 | 379/202.01 |
| 8,553,067 B2* | 10/2013 | Shaffer | H04N 7/147 | 348/14.01 |
| 8,570,373 B2* | 10/2013 | Variyath | G01S 5/02 | 348/143 |
| 8,621,352 B2* | 12/2013 | Ding | G06F 3/1454 | 715/719 |
| 8,626,496 B2* | 1/2014 | Toebes | H04M 3/42221 | 704/201 |
| 8,675,525 B2* | 3/2014 | Lee | H04M 3/56 | 370/259 |
| 8,677,229 B2* | 3/2014 | McAfee | G06F 17/2205 | 715/200 |
| 8,812,589 B2* | 8/2014 | Jain | G06F 15/16 | 709/204 |
| 8,886,011 B2* | 11/2014 | Chou | H04N 5/91 | 386/246 |
| 8,902,274 B2* | 12/2014 | Malegaonkar | H04N 7/147 | 340/573.1 |
| 8,938,216 B2* | 1/2015 | Shaffer | H04N 9/8205 | 455/412.1 |
| 8,972,869 B1* | 3/2015 | Willis | G06F 3/0482 | 715/753 |
| 9,100,546 B2* | 8/2015 | Bentley | H04N 7/155 | |
| 9,106,961 B2* | 8/2015 | Jiang | H04N 21/47412 | |
| 9,122,660 B2* | 9/2015 | Hebbar | G06F 17/218 | |
| 9,158,493 B2* | 10/2015 | McAfee | G06F 3/14 | |
| 9,160,551 B2* | 10/2015 | Murali | H04M 3/56 | |
| 9,256,695 B1* | 2/2016 | Willis | G06F 3/0482 | |
| 9,264,665 B2* | 2/2016 | Amano | H04N 7/15 | |
| 9,298,342 B2* | 3/2016 | Zhang | H04N 7/142 | |
| 9,300,698 B2* | 3/2016 | Huang | H04L 65/4015 | |
| 9,338,199 B2* | 5/2016 | Paulik | H04L 65/1096 | |
| 9,448,976 B2* | 9/2016 | Dulaney | G06F 16/4393 | |
| 9,473,742 B2* | 10/2016 | Griffin | H04M 3/567 | |
| 9,660,824 B2* | 5/2017 | Shi | H04L 12/1831 | |
| 9,685,195 B2* | 6/2017 | Shaffer | H04N 9/8205 | |
| 9,699,409 B1* | 7/2017 | Reshef | H04N 7/155 | |
| 9,704,139 B2* | 7/2017 | Kanuturi | G06Q 10/1095 | |
| 9,712,569 B2* | 7/2017 | Vashishtha | H04L 65/1089 | |
| 9,716,861 B1* | 7/2017 | Poel | H04N 7/15 | |
| 9,749,367 B1* | 8/2017 | Kirby | H04L 65/403 | |
| 9,817,912 B2* | 11/2017 | Willis | G06F 3/0482 | |
| 9,881,307 B2* | 1/2018 | Kapoor | G09B 5/00 | |
| 9,973,551 B2* | 5/2018 | Ouyang | H04L 65/403 | |
| 2003/0167339 A1* | 9/2003 | Zhu | G06Q 10/10 | 709/238 |
| 2003/0182375 A1* | 9/2003 | Zhu | G06F 17/24 | 709/205 |
| 2003/0220973 A1* | 11/2003 | Zhu | H04L 12/1831 | 709/205 |
| 2004/0054728 A1* | 3/2004 | Rust | H04L 29/06 | 709/205 |
| 2004/0114746 A1* | 6/2004 | Caspi | H04L 12/1831 | 379/202.01 |
| 2004/0190700 A1* | 9/2004 | Cutaia | H04M 3/42221 | 379/202.01 |
| 2005/0033817 A1* | 2/2005 | Wei | G06F 3/00 | 709/208 |
| 2005/0216847 A1* | 9/2005 | Zhu | H04L 67/10 | 715/751 |
| 2006/0004619 A1* | 1/2006 | Matheson | G06Q 10/10 | 703/1 |
| 2006/0161622 A1* | 7/2006 | Montgomery | G06F 3/1454 | 709/204 |
| 2006/0200520 A1* | 9/2006 | Vernon | H04L 29/06027 | 709/204 |
| 2006/0248144 A1* | 11/2006 | Zhu | H04L 12/1827 | 709/205 |
| 2007/0005699 A1* | 1/2007 | Yuan | H04L 67/22 | 709/204 |
| 2007/0022159 A1* | 1/2007 | Zhu | H04L 12/1831 | 709/204 |
| 2007/0288569 A1* | 12/2007 | Yuan | H04L 67/22 | 709/204 |
| 2008/0077671 A1* | 3/2008 | Rust | G06Q 10/10 | 709/205 |
| 2008/0137558 A1* | 6/2008 | Baird | H04L 12/1831 | 370/260 |
| 2009/0157469 A1* | 6/2009 | D'Urso | G06Q 10/10 | 705/7.19 |
| 2009/0307189 A1* | 12/2009 | Bobbitt | G06F 16/00 | |
| 2010/0235216 A1* | 9/2010 | Hehmeyer | G06Q 10/06316 | 705/7.26 |
| 2010/0235446 A1* | 9/2010 | Hehmeyer | G06Q 10/109 | 709/205 |
| 2011/0090822 A1* | 4/2011 | Lee | H04M 3/56 | 370/260 |
| 2011/0099006 A1* | 4/2011 | Sundararaman | G10L 15/26 | 704/208 |
| 2011/0107236 A1* | 5/2011 | Sambhar | H04L 12/1822 | 715/753 |
| 2011/0202599 A1* | 8/2011 | Yuan | H04L 67/22 | 709/203 |
| 2012/0002002 A1* | 1/2012 | Shaffer | H04N 7/147 | 348/14.09 |
| 2012/0128322 A1* | 5/2012 | Shaffer | H04N 9/8205 | 386/241 |
| 2012/0317485 A1* | 12/2012 | Ding | G06F 3/1454 | 715/719 |
| 2013/0018654 A1* | 1/2013 | Toebes | H04M 3/56 | 704/201 |
| 2013/0063542 A1* | 3/2013 | Bhat | H04N 7/15 | 348/14.03 |
| 2013/0064521 A1* | 3/2013 | Gonsalves | H04N 9/8205 | 386/230 |
| 2013/0222526 A1* | 8/2013 | Miyazawa | H04N 7/155 | 348/14.08 |
| 2013/0238999 A1* | 9/2013 | Helms | G06F 3/165 | 715/727 |
| 2013/0250035 A1* | 9/2013 | Murali | H04M 3/56 | 348/14.09 |
| 2013/0258043 A1* | 10/2013 | Amano | H04N 7/15 | 348/14.08 |
| 2013/0302018 A1* | 11/2013 | Jiang | H04N 21/47217 | 386/286 |
| 2013/0339431 A1* | 12/2013 | Yannakopoulos | H04L 12/1827 | 709/204 |
| 2014/0028789 A1* | 1/2014 | Bentley | H04N 7/155 | 348/14.12 |
| 2014/0032677 A1* | 1/2014 | Pittenger | H04L 12/1831 | 709/205 |
| 2014/0032681 A1* | 1/2014 | Jain | G06F 15/16 | 709/206 |

(56) References Cited

U.S. PATENT DOCUMENTS

| | | | |
|---|---|---|---|
| 2014/0122599 A1* | 5/2014 | Park | H04L 12/1818 709/204 |
| 2014/0152757 A1* | 6/2014 | Malegaonkar | H04N 7/147 348/14.01 |
| 2014/0161416 A1* | 6/2014 | Chou | H04N 5/91 386/241 |
| 2014/0198174 A1* | 7/2014 | Sanso | H04N 7/15 348/14.08 |
| 2014/0333528 A1 | 11/2014 | Murata | |
| 2014/0365568 A1* | 12/2014 | Huang | H04L 65/4015 709/204 |
| 2015/0012844 A1* | 1/2015 | Paulik | H04L 65/403 715/753 |
| 2015/0081806 A1* | 3/2015 | Kanuturi | G06Q 10/1095 709/206 |
| 2015/0085057 A1* | 3/2015 | Ouyang | H04N 7/15 348/14.02 |
| 2015/0085058 A1* | 3/2015 | Zhang | H04N 7/142 348/14.02 |
| 2015/0085707 A1* | 3/2015 | Shi | H04L 12/1831 370/261 |
| 2015/0089394 A1* | 3/2015 | Chen | H04N 7/142 715/753 |
| 2015/0098693 A1* | 4/2015 | Shaffer | H04N 9/8205 386/262 |
| 2015/0100635 A1* | 4/2015 | Huang | H04L 65/403 709/204 |
| 2015/0134748 A1* | 5/2015 | Zhang | H04L 65/403 709/206 |
| 2015/0149540 A1* | 5/2015 | Barker | H04L 12/1827 709/204 |
| 2015/0153996 A1 | 6/2015 | Miki | |
| 2015/0244682 A1* | 8/2015 | Biswas | G06F 3/0481 726/26 |
| 2015/0244749 A1* | 8/2015 | Willis | G06F 3/0482 709/206 |
| 2015/0371011 A1 | 12/2015 | Miki | |
| 2015/0373063 A1* | 12/2015 | Vashishtha | H04L 65/1089 348/14.07 |
| 2016/0095141 A1* | 3/2016 | Ma | H04W 76/10 455/416 |
| 2016/0182580 A1* | 6/2016 | Nayak | H04L 65/4038 709/204 |
| 2016/0234268 A1* | 8/2016 | Ouyang | H04L 65/403 |
| 2016/0234276 A1* | 8/2016 | Ouyang | H04L 65/403 |
| 2016/0269504 A1* | 9/2016 | Johar | H04L 67/306 |
| 2017/0142170 A1* | 5/2017 | Sylvain | H04L 65/1069 |
| 2017/0221253 A1* | 8/2017 | Banerjee | G06T 11/001 |
| 2017/0257598 A1* | 9/2017 | Reshef | H04N 7/155 |
| 2017/0293458 A1* | 10/2017 | Poel | H04N 7/15 |
| 2018/0006837 A1* | 1/2018 | Cartwright | H04L 65/605 |
| 2018/0034887 A1* | 2/2018 | Dunne | H04L 12/1831 |

\* cited by examiner

FIG.5

| SCREEN | MATERIAL ID | PAGE NUMBER | MATERIAL DISPLAY AREA (origin x, origin y, width, height) | HANDWRITTEN MEMO INFORMATION |
|---|---|---|---|---|
| SHARED | d100 | 10 | (100,100,200,300) | {SIZE=SMALL, COLOR=BLUE, TRACE={(100,100),(150,150)}} |
| INDIVIDUAL | d200 | 130 | (0,0,400,200) | {SIZE=LARGE, COLOR=RED, TRACE={(0,100),(100,150)}} |

| CHAPTER NAME | ORDER | START TIME |
|---|---|---|
| 1-1 | 1 | 0:00 |
| 1-2 | 2 | 1:00 |
| 1-3 | 3 | 1:30 |
| ⋮ | ⋮ | ⋮ |

| GROUP NAME | USER LIST |
|---|---|
| Group 1 | AA, BB, CC, DD |
| Group 2 | BB, CC |
| ... | ... |

FIG.21

| USER NAME | PASSWORD |
|---|---|
| AA | × × |
| BB | △△ |
| ... | ... |

FIG.22

| MEETING ID | MEETING NAME | START TIME | MEETING MATERIAL | ACCESS ENABLED GROUP | PICTURE RECORDING ENABLED GROUP |
|---|---|---|---|---|---|
| 1 | MEETING A | 2015/9/1 10:00 | x | Group 1 | Group 2 |
| 2 | MEETING B | 2015/9/2 12:00 | y | Group 2 | Group 2 |
| 3 | MEETING C | 2015/9/3 13:00 | z | Group 1 | Group 3 |
| ... | ... | ... | ... | ... | ... |

FIG.23

| PICTURE RECORDING ID | PICTURE RECORDING USER | MEETING ID | PICTURE RECORDING START TIME | PICTURE RECORDING END TIME | TYPE | PICTURE RECORDING DATA |
|---|---|---|---|---|---|---|
| 100 | BB | 1 | 2015/9/1 10:10 | 2015/9/1 10:50 | SHARED | 100.mov |
| 101 | CC | 1 | 2015/9/1 10:00 | 2015/9/1 11:30 | INDIVIDUAL | 101.mov |
| 102 | CC | 2 | 2015/9/2 12:00 | 2015/9/2 13:00 | SHARED | 102.mov |

FIG.25

MEETING ADMINISTRATION/NEW MEETING REGISTRATION

○ PLEASE INPUT INFORMATION OF MEETING TO BE REGISTERED.
INFORMATION

○○○ Conference Center

👤 KAI TARO
⬇ LOGOUT

OPEN, PARTICIPATION
📅 TODAY'S MEETING

MEETING ADMINISTRATION
🔗 MEETING LIST
➕ NEW MEETING REGISTRATION
PICTURE RECORDING LIST

OTHERS
❓ HELP
ⓘ ABOUT APPLICATION

| | | |
|---|---|---|
| MEETING NAME | NECESSARY 0/100 | |
| ACCESS ENABLED GROUP | Group 1 | |
| PICTURE RECORDING ENABLED GROUP | Group 2 | |
| START TIME | NECESSARY | NECESSARY |
| END TIME | | |
| LOCATION | | |
| REMARKS | | |
| PARTICIPATION PASSWORD | | RE-ENTRY |
| OPEN KEY | | RE-ENTRY |
| MEETING NAME IN MEETING LIST | ● DISPLAY ○ DO NOT DISPLAY | |
| BAN AGAINST PRESENTER ALTERNATION | NO | |
| MATERIAL DOWNLOAD | ● PERMIT ○ DO NOT PERMIT | CAN BE CHANGED WHEN OPEN KEY IS INPUT. |

AGENDA, MATERIAL

● 1   AGENDA NAME: AGENDA A   PRESENTER: MASUMOTO
    MATERIAL NAME: MATERIAL 001   REMARKS: ABCDEFGHIJKLMNO   DOWNLOAD PERMISSION ☑   ORIGINAL FILE EXIST
    ☐ MATERIAL 002   ABCDEFGHIJK   ☑

○ 2   AGENDA NAME: AGENDA B   PRESENTER: MASUMOTO
    MATERIAL NAME: MATERIAL 002   REMARKS: ABCDEFGHIJKLMNO   DOWNLOAD PERMISSION ☑   ORIGINAL FILE EXIST

[ ADD ]  [ EDIT ]  [ DELETE ]

[ STORE ]

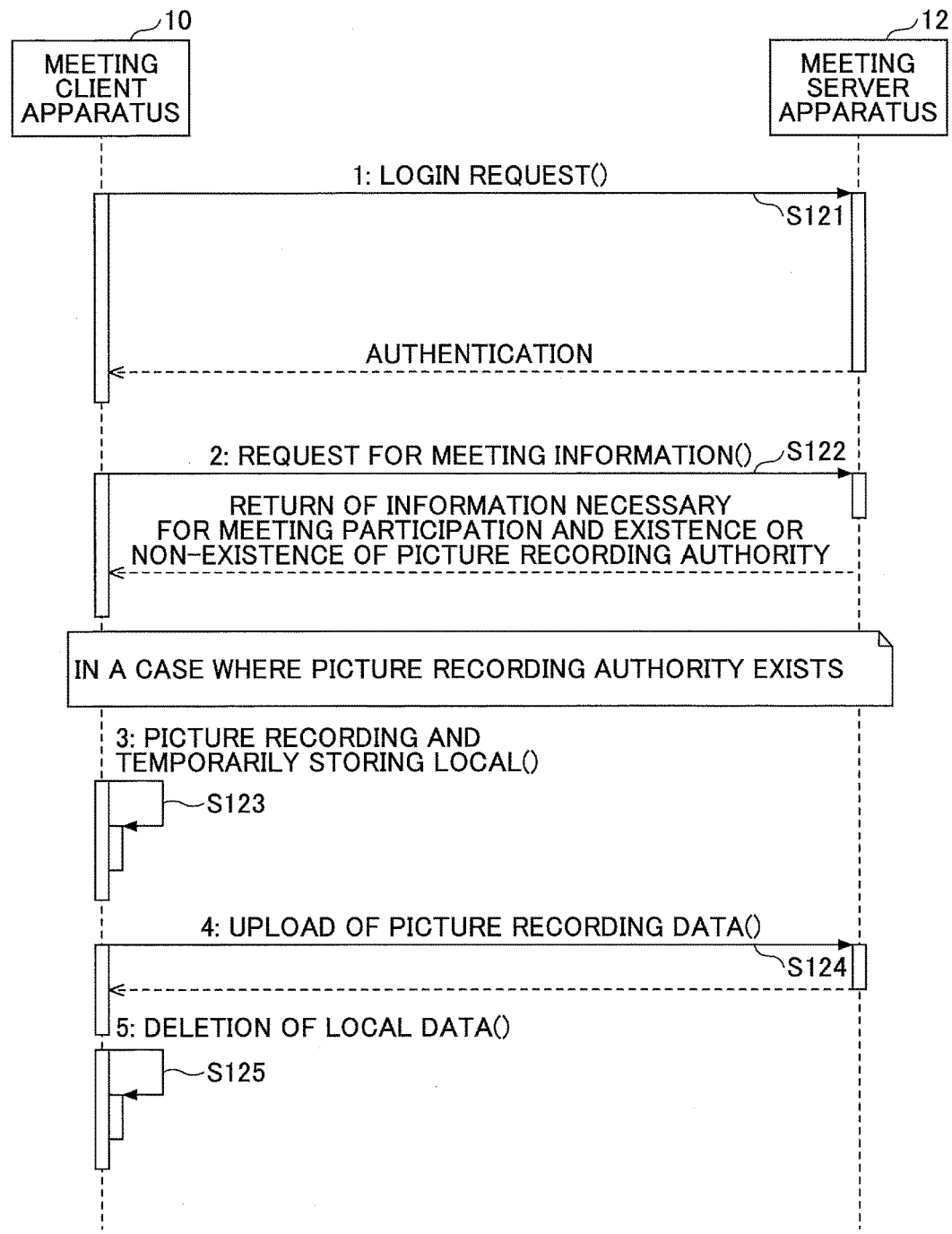

FIG.28

OOO Conference Center

KAI TARO
LOGOUT

OPEN, PARTICIPATION
TODAY'S MEETING

MEETING ADMINISTRATION
MEETING LIST
NEW MEETING REGISTRATION
PICTURE RECORDING LIST

OTHERS
HELP
ABOUT APPLICATION

---

PICTURE RECORDING ADMINISTRATION/PICTURE RECORDING LIST ~1400

○MEETING SATISFYING DESIGNATED CONDITION CAN BE SEARCHED.

SEARCH CONDITION

MEETING ID, MEETING NAME

START TIME [PREVIOUS DAY] [NEXT DAY]

MEETING STATE  ●ALL  ○ONGOING  ○NOT YET OPENED  ○IMPOSSIBLE TO OPEN

SEARCH RESULT ~1401

| | PICTURE RECORDING ID | MEETING NAME | PICTURE RECORDING USER | PICTURE RECORDING START TIME | TYPE |
|---|---|---|---|---|---|
| ○ | 100 | ... | BB | 2015/01/26 10:00 | SHARED |
| ○ | 101 | ... | CC | 2015/01/28 09:00 | INDIVIDUAL |
| ○ | 102 | ... | CC | 2015/01/28 09:45 | SHARED |

PREVIOUS 10    1-10/12    NEXT 10

[REPRODUCTION]

FIG.30

| MEETING ID | MEETING NAME | START TIME | MEETING STATE | EXISTENCE OR NON-EXISTENCE OF AGENDA | ... |
|---|---|---|---|---|---|
| 111 | ○○○○ | △△△△ | BEFORE OPEN | NO | ... |
| 222 | ○○○○○ | △△△△△ | BEFORE OPEN | YES | ... |
| ... | ... | ... | ... | ... | ... |

FIG.31

| AGENDA ID | MEETING ID | AGENDA NAME | PRESENTER | PRESENTATION TIME | ... |
|---|---|---|---|---|---|
| AAA | 222 | ○○○○○○ | ×××× | □□□ | ... |
| BBB | 222 | ○○○ | ×××××× | ■■■ | ... |
| ... | ... | ... | ... | ... | ... |

FIG.32

| PICTURE RECORDING ID | AGENDA ID | PICTURE RECORDING USER | MEETING ID | PICTURE RECORDING START TIME | PICTURE RECORDING END TIME | TYPE | PICTURE RECORDING DATA |
|---|---|---|---|---|---|---|---|
| 100 | AAA | BB | 1 | 2015/9/1 10:10 | 2015/9/1 10:50 | SHARED | 100.mov |
| 101 | BBB | CC | 1 | 2015/9/1 10:00 | 2015/9/1 11:30 | INDIVIDUAL | 101.mov |
| 102 | XYZ | CC | 2 | 2015/9/2 12:00 | 2015/9/2 13:00 | SHARED | 102.mov |

FIG.33

```
<message guid="REQUEST IDENTIFICATION GUID" to="MEETING J ID" type="set" class="SyncPage"
messageType="2" operation="update">
  <body>pagenum, X, Y, W, H, AGENDA ID</body>
</message>
```

- REQUEST IDENTIFICATION GUID: REFERRING TO ATTRIBUTE DURING MEETING
- MEETING J ID: REFERRING TO MEETING J ID
- pagenum: CHARACTER STRING INDICATIVE OF PAGE.
  doc_id(MATERIAL ID)_(UNDERBAR)num(PAGE NUMBER OF MATERIAL)
  ex)150_8
- X: X COORDINATE OF UPPER LEFT OF RECT USED FOR SYNCHRONIZATION OF ENLARGEMENT/REDUCTION
- Y: Y COORDINATE OF UPPER LEFT OF RECT USED FOR SYNCHRONIZATION OF ENLARGEMENT/REDUCTION
- W: WIDTH FROM UPPER LEFT OF RECT USED FOR SYNCHRONIZATION OF ENLARGEMENT/REDUCTION
- H: HEIGHT FROM UPPER LEFT OF RECT USED FOR SYNCHRONIZATION OF ENLARGEMENT/REDUCTION
* COORDINATE/WIDTH/HEIGHT ARE ALL BASED ON CropBox STANDARD
- AGENDA ID: ONLY FOR A CASE OF MEETING HAVING AGENDA

FIG.36

AGENDA

TIME    2015/10/05 09:15

| 1 | AGENDA 1 | |
|---|---|---|
| | PRESENTER | Mr. A |
| | PRESENTATION TIME | 15 MINUTES |
| 2 | AGENDA 2 | |
| | PRESENTER | Mr. B |
| | PRESENTATION TIME | 30 MINUTES |
| 3 | AGENDA 3 | |
| | PRESENTER | Mr. C |
| | PRESENTATION TIME | 15 MINUTES |
| 4 | AGENDA 4 | |
| | PRESENTER | Mr. D |
| | PRESENTATION TIME | 30 MINUTES |
| 5 | OVERVIEW | |
| | PRESENTER | CHAIRMAN |
| | PRESENTATION TIME | 5 MINUTES |

TERMINAL APPARATUS, SCREEN RECORDING METHOD, PROGRAM, AND INFORMATION PROCESSING SYSTEM

BACKGROUND OF THE INVENTION

1. Field of the Invention

The present invention relates to a terminal apparatus, a screen recording method, a program, and an information processing system.

2. Description of the Related Art

In, for example, a meeting, each participant may conduct picture recording of a printed material, a material image projected by a projector apparatus, and a content of writing on a whiteboard and/or sound recording of a debate in order to record the meeting.

On the other hand, tablet type computers and wireless communications using the tablet type computers are becoming popular. In this situation, an information presentation system such as a paperless meeting system, in which each participant mutually shares an image data and present a material by the tablet type computers, is put to practical use (see, for example, Patent Document 1).

Patent Document 1: Japanese Laid-Open Patent Publication No. 2014-219807

SUMMARY OF THE INVENTION

It is a general object of at least one embodiment of the present invention to provide a terminal apparatus that substantially obviates one or more problems caused by the limitations and disadvantages of the related art.

One aspect of the embodiments of the present invention may be to provide a terminal apparatus of switching over a first mode, in which a first screen being in synchronization with another terminal apparatus is displayed, and second mode, in which a second screen being in desynchronization with the another terminal apparatus is displayed, upon a mode switchover operation by an operator including processor configured to receive a mode switchover operation between the first mode and the second mode by the operator and display the first screen of the first mode or the second screen of the second mode, which is switched over by the mode switchover operation; and to receive a screen recording operation by the operator and record the first screen or the second screen for each of the first and second modes regardless of the display of the first screen of the first mode or the second screen of the second mode by the screen display input unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 5 illustrates an exemplary structure of screen information stored in a screen information memory unit.

FIG. 15 is an exemplary image chart of a meeting record list screen.

FIG. 20 is an exemplary structural view of group information.

FIG. 21 illustrates an exemplary structure of user information.

FIG. 22 illustrates an exemplary structure of meeting information.

FIG. 23 illustrates an exemplary structure of meeting picture recording information (information of picture recording of a meeting).

FIG. 25 is an exemplary image chart of a meeting registration screen after login.

FIG. 26 is a sequence diagram of an exemplary process of picture recording of the meeting.

FIG. 28 is an exemplary image chart of a picture recording list screen.

FIG. 30 illustrates an exemplary structure of meeting information.

FIG. 31 illustrates an exemplary structure of agenda information.

FIG. 32 illustrates an exemplary structure of the meeting picture recording information.

FIG. 33 illustrates an exemplary structure of an XMPP command.

FIG. 36 illustrates an exemplary image of an agenda selection screen;

DETAILED DESCRIPTION OF THE PREFERRED EMBODIMENTS

A description is given below, with reference to the FIG. 1 through FIG. 36 of embodiments of the present invention. Where the same reference symbols are attached to the same parts, repeated description of the parts is omitted.

REFERENCE SYMBOLS TYPICALLY DESIGNATE AS FOLLOWS

1: meeting system;
10: meeting client apparatus;
12: meeting server apparatus;
14: meeting display apparatus;
51: control unit;
52: communication unit;
53: terminal screen display input unit;
54: meeting information memory unit;
55: meeting picture recording information memory unit;
55a: meeting picture recording temporary memory unit;
56: screen information memory unit;
57: login information request unit;
58: meeting picture recording unit;
59: meeting picture recording start end unit;
61: information administration unit;
62: communication unit;
63: meeting information memory unit;
64: group information memory unit;
65: user information memory unit;
66: meeting picture recording information memory unit;
501, 601: input device;
502, 602: display device;
503, 603: external I/F;
503a, 603a: recording medium;
504, 604: Random Access Memory (RAM);
505, 605: Read Only Memory (ROM);
506, 606: Central Processing Unit (CPU);
507, 607: communication I/F;
508, 608: Hard Disk Drive (HDD);
1000: individual screen;
1001: picture recording button;
1002: mode switchover button;
p1003: presenter switchover button;
1100: meeting record list screen;
1200: reproduction screen;
1201: moving image display area;
1202: chapter information;
1300: meeting registration screen;
1400: picture recording list screen;
1401: picture recording list;
1500: agenda selection screen; and
N1: network.

First Embodiment

<System Structure>

Figure 1:
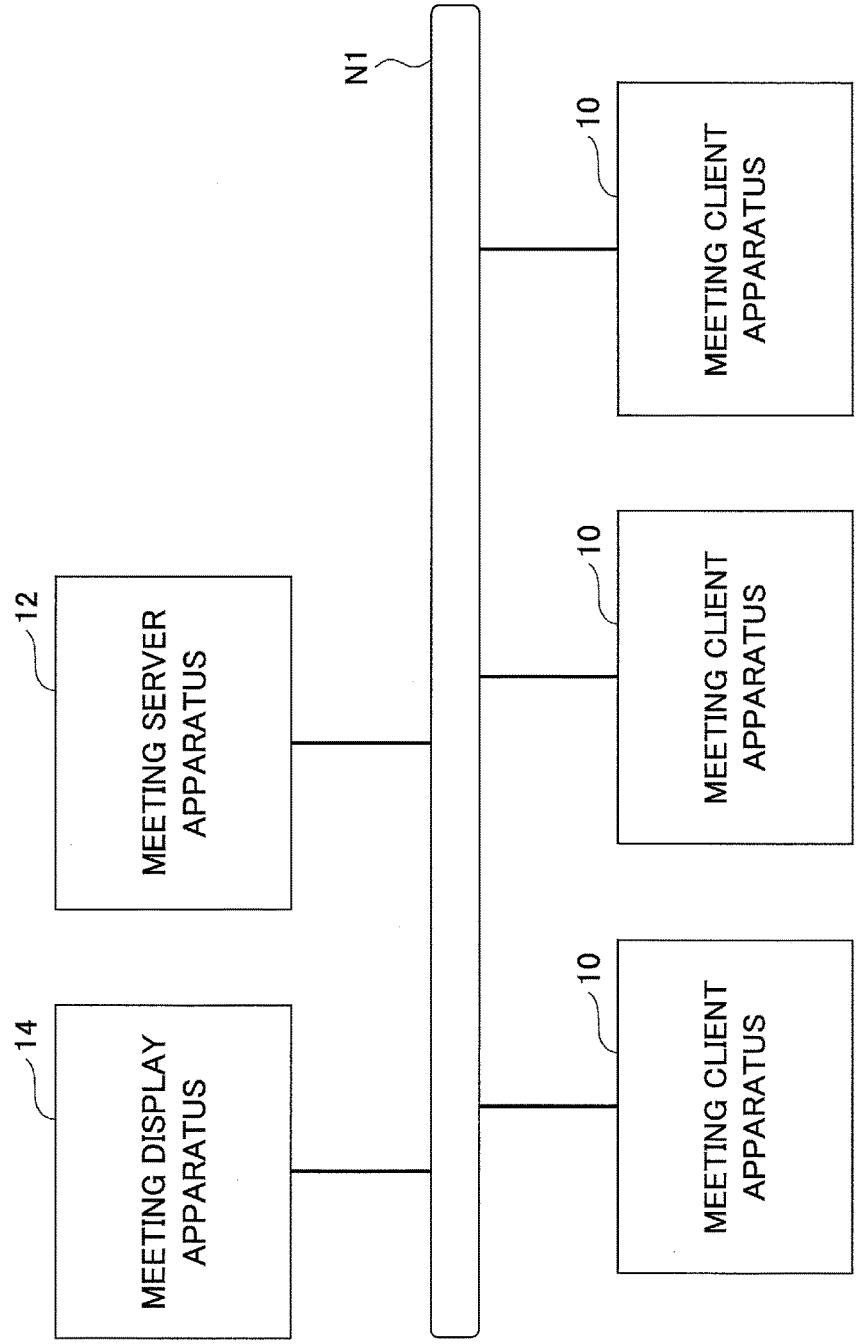
FIG. 1 illustrates an exemplary structure of a meeting system of an embodiment.

FIG. 1 illustrates an exemplary structure of a meeting system of a first embodiment. The meeting system 1 illustrated in FIG. 1 is the exemplary structure in which a meeting client apparatus 10, a meeting server apparatus 12, and a meeting display apparatus 14 are connected by a network N1 such as a LAN.

The meeting server apparatus 12 has functions of opening a meeting, controlling participation, and distributing an input operation to a participating meeting client apparatus 10 in real time together with functions of administering meeting information a meeting material, and the like.

The meeting server apparatus 12 is substantialized by software and a service, which are operated in at least one computer. The meeting server apparatus 12 may be software and a service, which are activated in multiple computers. The meeting server apparatus 12 may work in a mode of, so-called, a cloud service. It is sufficient that the meeting server apparatus 12 has a meeting server function. The meeting server apparatus 12 can be substantialized by various hardware structures.

The meeting client apparatus 10 has functions of acquiring the meeting information, the meeting material, and so on from the meeting server apparatus 12, receiving an operation necessary for advancing the meeting from an operator such as a presenter and a participant of the meeting, and causing the presenter, the participant, or the like to browse the meeting material. The operator such as the presenter and the participant of the meeting can participate in the meeting through the meeting client apparatus 10.

The meeting client apparatus 10 may be a personal computer, a portable information terminal such as a tablet terminal, a smartphone, a mobile phone, and a personal digital assistance (PDA), a dedicated meeting terminal, an electronic white board, and an image forming apparatus such as a multifunction peripheral (MFP) and a printer. The meeting client apparatus 10 receives an input operation by the presenter from the meeting server apparatus 12 in real time while participating in the meeting and shares a display screen with another meeting client apparatus 10.

One of the meeting client apparatuses 10 may be operated by the presenter to request the meeting server apparatus 12 to start or end the meeting. The meeting client apparatus 10 may be switched over two modes, namely a shared mode and an individual mode. For example, in the shared mode, a meeting material on the meeting client apparatus 10 of the participant is displayed in synchronism with a display of the meeting material on the screen of the meeting client apparatus 10 of the presenter along with meeting proceedings. The shared screen to be synchronized includes a page display of the meeting material, a display of writing (a handwritten memo) on the meeting material, and a display of a pointer on the meeting material.

In the individual mode, the individual screen, on which the display is not synchronism with the meeting material on the screen of the meeting client apparatus 10 of the presenter, can be freely (asynchronously) regardless of the meeting proceedings by the presenter. The meeting material is an example of the content, in which an input operation (for example, a change of a displayed page or an addition of a handwritten memo) from the presenter.

The meeting display apparatus 14 is an exemplary output apparatus installed in, for example, a meeting room and causing the meeting material to be browsed on a large screen. The meeting display apparatus 14 may be a display device such as an electronic whiteboard or a projection apparatus such as a projector.

The meeting system 1 illustrated in FIG. 1 is an example, and all apparatuses illustrated in FIG. 1 are not always necessary. For example, the meeting system 1 may be structured such that the functions of the meeting server apparatus 12 are performed by the at least one meeting client apparatus 10 instead of the meeting server apparatus 12. Further, the meeting system 1 may be without the meeting display apparatus 14.

<Hardware Structure>

Figure 2:
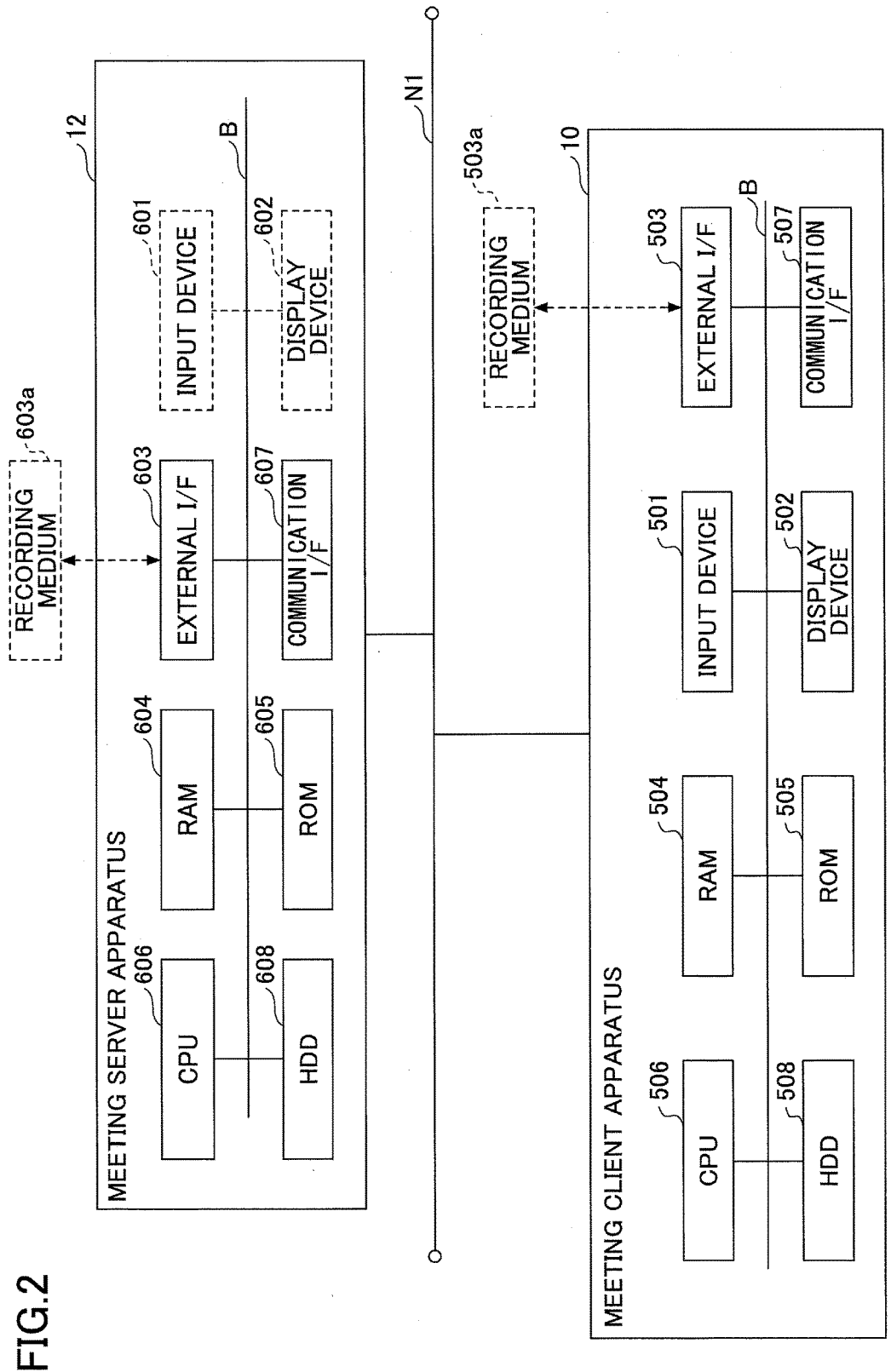
FIG. 2 illustrates an exemplary hardware structure of the meeting system of the embodiment.

The meeting client apparatus and the meeting server apparatus 12 are substantialized by the hardware structure illustrated in FIG. 2.

FIG. 2 illustrates an exemplary hardware structure of the meeting system of the first embodiment. Referring to FIG. 2, the meeting client apparatus 10 includes an input device 501, a display device 502, an external I/F 503, a RAM 504, a ROM 505, a CPU 506, a communication I/F 507, a HDD 508, and so on, mutually connected by a bus B. The meeting client apparatus 10 may be structured to have a camera, a mic, a speaker, and so on.

The input device 501 may include a keyboard, a mouse, and a touch panel used to input various operation signals to the meeting client apparatus 10. The display device 502 includes a display or the like to display a processing result obtained by the meeting client apparatus 10. The communication I/F 507 is an interface provided to connect the meeting client apparatus 10 with the network N1. The meeting client apparatus 10 can perform a data communication with the meeting server apparatus 12 through the communication I/F 507.

The HDD 508 is a non-volatile memory device storing programs and/or data. The stored program and data are an operating system (OS) which is basic software controlling the entire meeting client apparatus 10, application software providing various functions in the OS, and so on. Further, the HDD 508 administers the stored program and the stored data using a predetermined file system and/or a predetermined database (DB).

The external I/F 503 is an interface with an external apparatus. The external apparatus is a recording medium 503a or the like. With this, the meeting client apparatus 10 can read information from the recording medium 503a and/or write information to the recording medium 503a through the external I/F 503. The recording medium 103a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the meeting client apparatus 10. The RAM 504 is a volatile semiconductor memory temporarily storing a program or data.

The CPU 506 is an arithmetic device that reads the program and/or data from the memory device such as the ROM 505, the HDD 508, or the like. The read program or data undergo the process to thereby realize an entire control or functions of the meeting client apparatus 10.

The meeting client apparatus 10 can realize various processes described later by executing the program in the above hardware structure.

Referring to FIG. 2, the meeting server apparatus 12 includes an input device 601, a display device 602, an external I/F 603, a RAM 604, a ROM 605, a CPU 606, an external I/F 607, a HDD 608, and so on, mutually connected by a bus B. It is acceptable to form such that the input device 601 and the display device 602 are connected when necessary.

The input device 601 may include a keyboard, a mouse, and so on used to input various operation signals to the meeting server apparatus 12. The display device 602 includes a display or the like to display a processing result obtained by the meeting server apparatus 12.

The communication I/F 607 is an interface provided to connect the meeting server apparatus 12 with the network N1. The meeting client apparatus 12 can perform a data communication with the meeting client apparatus 10 through the communication I/F 607.

The HDD 608 is a non-volatile memory device that stores programs and the data. The stored program and data are an operating system (OS) which is basic software controlling the entire meeting server apparatus 12, application software providing various functions in the OS, and so on. Further, the HDD 608 administers the stored program and the stored data using a predetermined file system and/or a predetermined database (DB).

The external I/F 603 is an interface with an external apparatus. The external apparatus is a recording medium 603a or the like. With this, the meeting server apparatus 12 can read information from the recording medium 603a and/or write information to the recording medium 603a through the external I/F 603. The recording medium 603a is a flexible disk, a CD, a DVD, an SD memory card, a USB memory, or the like.

The ROM 605 is a non-volatile semiconductor memory (a memory device), which can hold a program and/or data even when a power source is powered off. The ROM 605 stores programs and data such as basic input/output system (BIOS), OS setup, network setup, or the like, which are executed at a time of booting up the meeting server apparatus 12. The RAM 604 is a volatile semiconductor memory temporarily storing a program or data.

The CPU 606 is an arithmetic device that reads the program and/or data from the memory device such as the ROM 605, the HDD 608, or the like. The read program or data undergo the process to thereby realize an entire control or functions of the meeting server apparatus 12.

The meeting server apparatus 12 can realize various processes described later by executing the program in the above hardware structure. Description of the hardware structure of the meeting display apparatus 14 is omitted.

<Software Structure>

The meeting client apparatus 10 and the meeting server apparatus 12 of the meeting system 1 of the first embodiment are substantialized by a function block described below. The function block described later illustrates a structure necessary for the explanation, and the structure unnecessary for the explanation is appropriately omitted.

<<Meeting Client Apparatus>>

Figure 3:
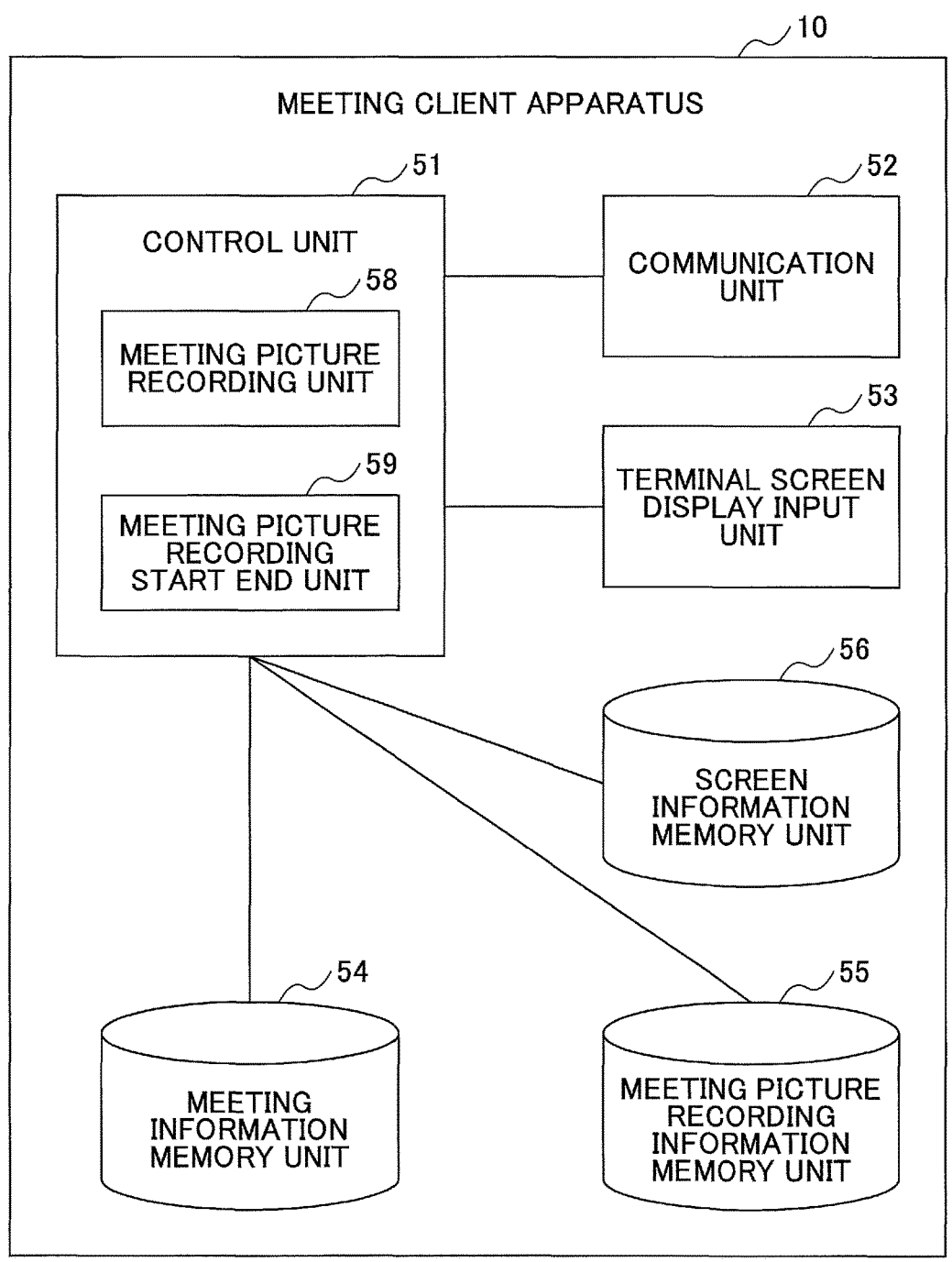
FIG. 3 is an exemplary functional block diagram of a meeting client apparatus.

The meeting server 10 is substantialized by, for example, a function block illustrated in FIG. 3. FIG. 3 is an exemplary functional block chart of the meeting client apparatus. The meeting client apparatus 10 illustrated in FIG. 3 substantializes a control unit 51, a communication unit 52, a terminal screen display input unit 53, a meeting information memory unit 54, a meeting picture recording information memory unit, and a 55 screen information memory unit 56 by executing the program. The control unit 51 includes a meeting picture recording unit 58 and meeting picture recording start end unit 59. The program executed by the meeting client apparatus 10 is, for example, an application installed in the meeting client apparatus 10.

The meeting picture recording unit 58 of the control unit 51 performs picture recording for a shared screen of the participating meeting 58. The meeting picture recording start end unit 59 controls a start and end of the picture recording for the shared screen using the meeting picture recording unit 58. The communication unit 52 communicates with the meeting server apparatus 12 through the network N1. The terminal screen display input unit 53 displays a screen and receives an input from an operator.

For example, the terminal screen display input unit 53 displays a meeting material using the meeting information, the meeting material, or the like, which are acquired from the meeting server apparatus 12. The terminal screen display input unit 53 receives various operations from an operator such as the presenter and the participant in the meeting and displays the meeting screen corresponding to the operation. The meeting information memory unit 54 stores the meeting information and the material information, which are received from the meeting server apparatus 12. The meeting picture recording information memory unit 55 stores meeting picture recording information related to picture recording of the shared screen. The screen information memory unit 56 stores information (screen information) of the present shared screen and individual screen as described later.

The meeting material is a file of, for example, a Portable Document Format (PDF). In a case of the meeting client apparatus 10 implemented in a web browser, screen data may be received from the meeting server apparatus 12 every time instead of the file of PDF.

Further, in the meeting system 1, the function may differ depending on the role of the meeting client apparatus 10. For example, in the meeting system 1, roles such as a facilitator of meeting proceedings, a presenter, a participant, and so on can be set. The facilitator can determine a presenter or the meeting material. The presenter can operate page turn, hand writing, and enlargement and reduction of the meeting material in the shared mode. The participant can browse the meeting material in the shared mode. Within the first embodiment, an example where the role of the presenter and the participant of the meeting is provided in the meeting system 1 is described.

<<Meeting Server Apparatus>>

Figure 4:
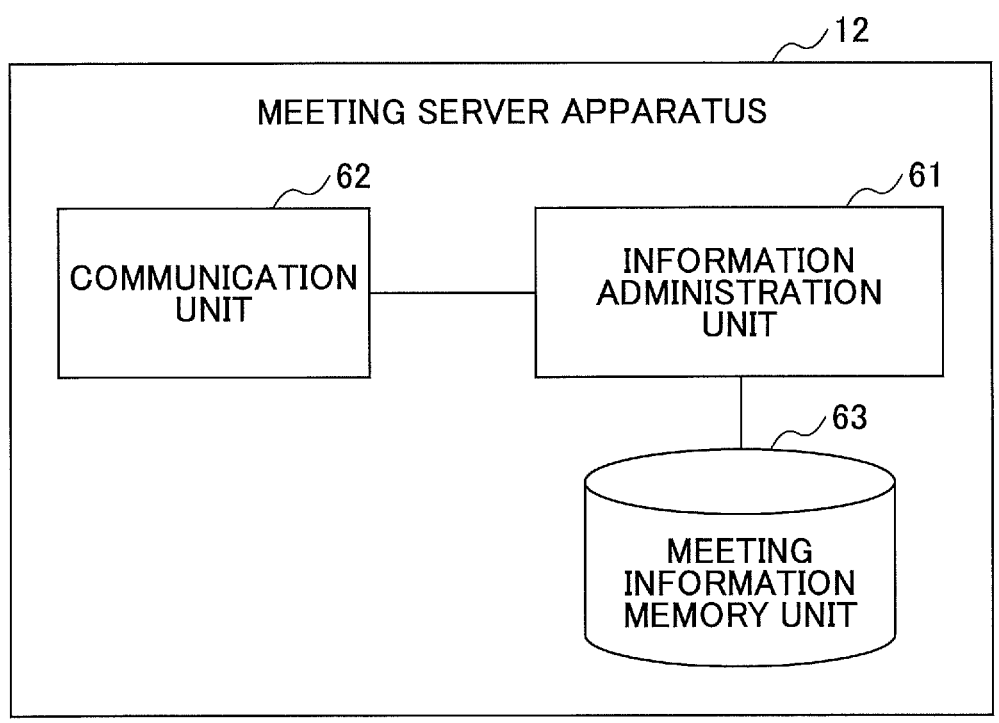
FIG. 4 is an exemplary functional block diagram of a meeting server apparatus.

The meeting server apparatus 12 is substantialized by, for example, a function block as illustrated in FIG. 4. FIG. 4 is an exemplary functional block diagram of a meeting server apparatus. The meeting server apparatus 12 substantializes an information administration unit 61, a communication unit 62, and a meeting information memory unit 63.

The information administration unit 61 administers meeting information such as a meeting name, a meeting open date, and a meeting attending user and a meeting material. The communication unit 62 communicates with the meeting client apparatus 10 through the network N1. The meeting information memory unit 63 stores the meeting information and meeting material sent to the meeting client apparatus 10.

In the meeting system 1 of the first embodiment, information related to the presenter's input operation such as the page turn, the hand written memo, and the enlargement and reduction for the meeting material is delivered to the meeting client apparatuses 10 participating in the meeting using the Extensible Messaging and Presence Protocol (XMPP). The XMPP is an example and another protocol may be used.

In the meeting system 1, the input operation for the meeting material on the screen (the shared screen) of the meeting client apparatus 10 of the presenter can be shared by delivering the information related to the presenter's input operation such as the page turn, the hand written memo, and the enlargement and reduction to the meeting client apparatuses 10 participating in the meeting using the XMPP.

<<Data Structure>>

FIG. 5 illustrates an exemplary structure of screen information stored in a screen information memory unit. Referring to FIG. 5, regarding the screen information, the information of the shared screen and the information of the individual screen are separately stored. The screen information illustrated in FIG. 5 is structured to include a material ID, a page number, a material display area, and handwritten memo information. The screen information illustrated in FIG. 5 is to store information of the present shared screen and the present individual screen.

Therefore, in using the screen information illustrated in FIG. 5, the meeting client apparatus 10 can switch over the display between the individual screen and the shared screen by switching over the mode between the individual mode and shared mode.

<Detailed Process>

Hereinafter, a detailed process of the meeting system 1 of the first embodiment is described.

<<Meeting Process>>

The presenter and participant of the meeting operates the meeting client apparatus 10 to request for an access to a meeting participation screen of the meeting server apparatus 12. The meeting client apparatus 10 sends a meeting information acquisition request by accessing the Uniform Resource Identifier (URI) of the meeting participation screen of, for example, the meeting server apparatus 12.

The meeting server apparatus 12 sends meeting information of an ongoing meeting and a meeting, to which the participator can participate, to the meeting client apparatus 10. The meeting client apparatus 10 causes a display device 502 and so on to display the meeting participation screen based on the received meeting information. The meeting participation screen includes a meeting list formed based on the meeting information of the ongoing meeting and the meeting, to which the participator can participate. The presenter and participant of the meeting selects the ongoing meeting and the meeting, to which the participator can participate, from the meeting list. The meeting client apparatus 10 sends a participation request to the meeting selected by the presenter and participant of the meeting.

The meeting server apparatus 12 establishes a communication path (a session) to the meeting client apparatus 10 based on the participation request received from the meeting client apparatus 10. The meeting server apparatus 12 and the meeting client apparatus 10 send and receive information necessary to display the shared screen and the individual screen using the established communication path.

As described, in the meeting system 1 of the first embodiment, a message indicative of the input operation of the presenter is sent from the meeting client apparatus 10 of the presenter to the meeting client apparatus 10 of the participant through the meeting server apparatus 12 along the established communication path real time. Within the embodiment, the XMPP is used as an exemplary protocol for delivering a message real time using this communication path. The communication path may be established not only by XMPP but also by a protocol such as BOSH and WebSocket or a method of Commet.

Figure 6:
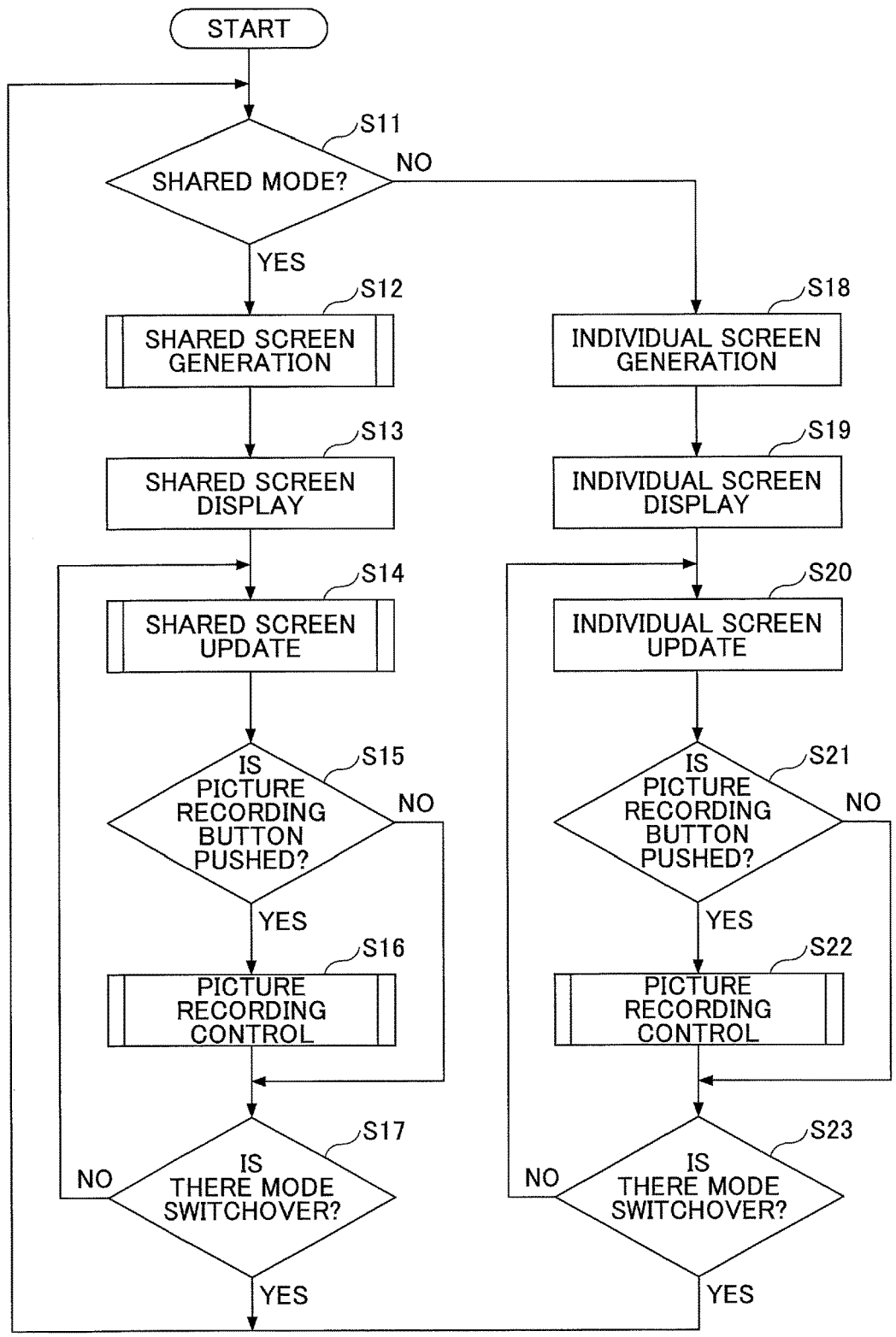
FIG. 6 is an exemplary flowchart of a process of displaying a meeting screen in a meeting client apparatus of the embodiment.

The meeting client apparatus 10 participating in the meeting performs a process of displaying the meeting screen in a procedure illustrated in, for example, FIG. 6. FIG. 6 is an exemplary flowchart of a process of displaying a meeting screen in the meeting client apparatus of the first embodiment.

In step S11, the terminal screen display input unit 53 of the meeting client apparatus 10 determines whether the meeting client apparatus 10 is in the shared mode. If the meeting client apparatus 10 is in the shared mode, the terminal screen display input unit 53 performs a shared screen generation process in step S12 described below.

In step S13, the terminal screen display input unit 53 displays the shared screen generated in step S12. In step S14, the terminal screen display input unit 53 updates the shared screen in conformity with the input operation of the presenter received by the meeting client apparatus 10 of the presenter. A detailed shared screen update process of step S14 is described later.

In step S15, the terminal screen display input unit 53 determines whether the picture recording button provided in the shared screen is pushed. When the picture recording button is pushed, the terminal screen display input unit 53 calls a picture recording control process in step S16 described below. In step S15, the state of no picture recording and the state of picture recording are switched over by pushing a picture recording button in step S15. The state of no picture recording and the state of picture recording are switched over every push of the picture recording button.

In a case where the state of no picture recording is switched over to the state of picture recording by pushing the picture recording button, in the picture recording control process of step S16, the meeting picture recording unit 58 performs picture recording of the shared screen of the meeting by a control of the meeting picture recording start end unit 59 of the control unit 51. On the other hand, in a case where the state of picture recording is switched over to the state of no picture recording by pushing the picture recording button, in the picture recording control process of step S16, the meeting picture recording unit 58 ends picture recording of the shared screen of the meeting by the control of the meeting picture recording start end unit 59 of the control unit 51. A detailed picture recording control process of step S16 is described later.

Meanwhile, if the picture recording button is not pushed in step S15, the terminal screen display input unit 53 performs the process of step S17 without calling the picture recording control process in step S16.

Then, the process goes to step S17 and the terminal screen display input unit 53 determines whether a mode switchover operation from the shared mode to the individual mode is received from the operator. If the mode switchover operation from the shared mode to the individual mode is not received from the operator, the terminal screen display input unit 53 returns to step S14 and continues the process. If the mode switchover operation from the shared mode to the individual mode is received from the operator, the terminal screen display input unit 53 returns to step S11 and continues the process.

If it is not the shared mode in step S11, the terminal screen display input unit 53 performs an individual screen generation process in step S18. In the individual screen generation process of step S18, a material ID of the individual screen, a page number, and a material display area are acquired from the screen information of FIG. 5, and the individual screen is generated from the meeting material. In the individual screen generation process of step S18, handwritten memo information is acquired from the screen information of FIG. 5, and a handwritten memo of an individual is added to the individual screen.

In step S19, the terminal screen display input unit 53 displays the individual screen generated in step S18. In step S20, the terminal screen display input unit 53 receives an input operation by the operator and updates the individual screen in response to the input operation.

In step S21, the terminal screen display input unit 53 determines whether the picture recording button provided in the individual screen is pushed. When the picture recording button is pushed, the terminal screen display input unit 53 calls a picture recording control process in step S22 described below. In step S21, the state of no picture recording and the state of picture recording are switched over by pushing the picture recording button in step S21. The state of no picture recording and the state of picture recording are switched over every push of the picture recording button.

In a case where the state of no picture recording is switched over to the state of picture recording by pushing the picture recording button, in the picture recording control process of step S22, the meeting picture recording unit 58 performs picture recording of the shared screen of the meeting by a control of the meeting picture recording start end unit 59 of the control unit 51. On the other hand, in a case where the state of picture recording is switched over to the state of no picture recording by pushing the picture recording button, in the picture recording control process of step S22, the meeting picture recording unit 58 ends picture recording of the shared screen of the meeting by the control of the meeting picture recording start end unit 59 of the control unit 51. A detailed picture recording control process of step S22 is described later.

Meanwhile, if the picture recording button is not pushed in step S21, the terminal screen display input unit 53 performs the process of step S23 without calling the picture recording control process in step S22.

Then, the process goes to step S23 and the terminal screen display input unit 53 determines whether a mode switchover operation from the individual mode to the shared mode is received from the operator. If the mode switchover operation from the individual mode to the shared mode is not received from the operator, the terminal screen display input unit 53 returns to step S20 and continues the process. If the mode switchover operation from the individual mode to the shared mode is received from the operator, the terminal screen display input unit 53 returns to step S11 and continues the process.

Figure 7:
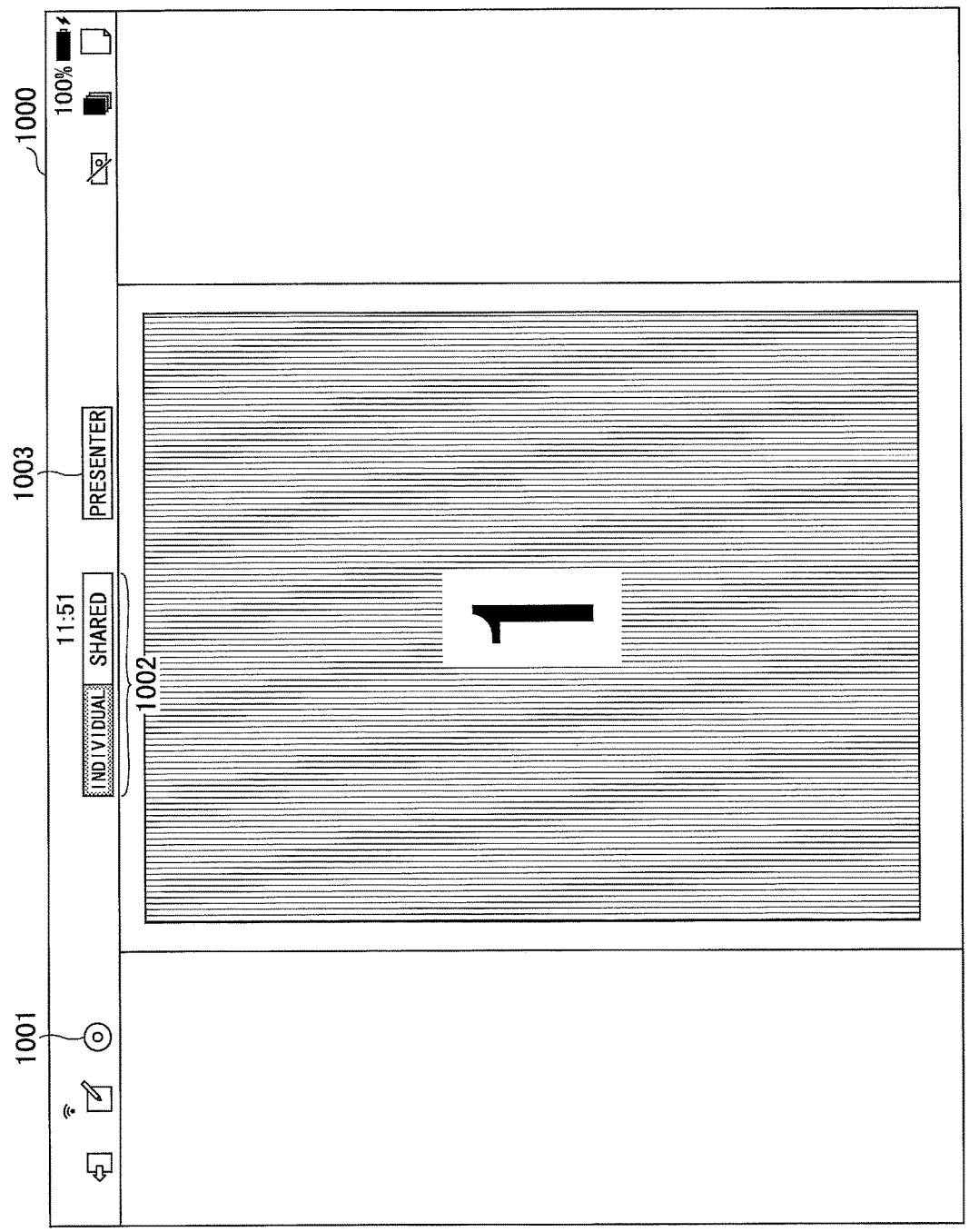
FIG. 7 illustrates an exemplary image of an individual screen in a state of no picture recording.
Figure 8:
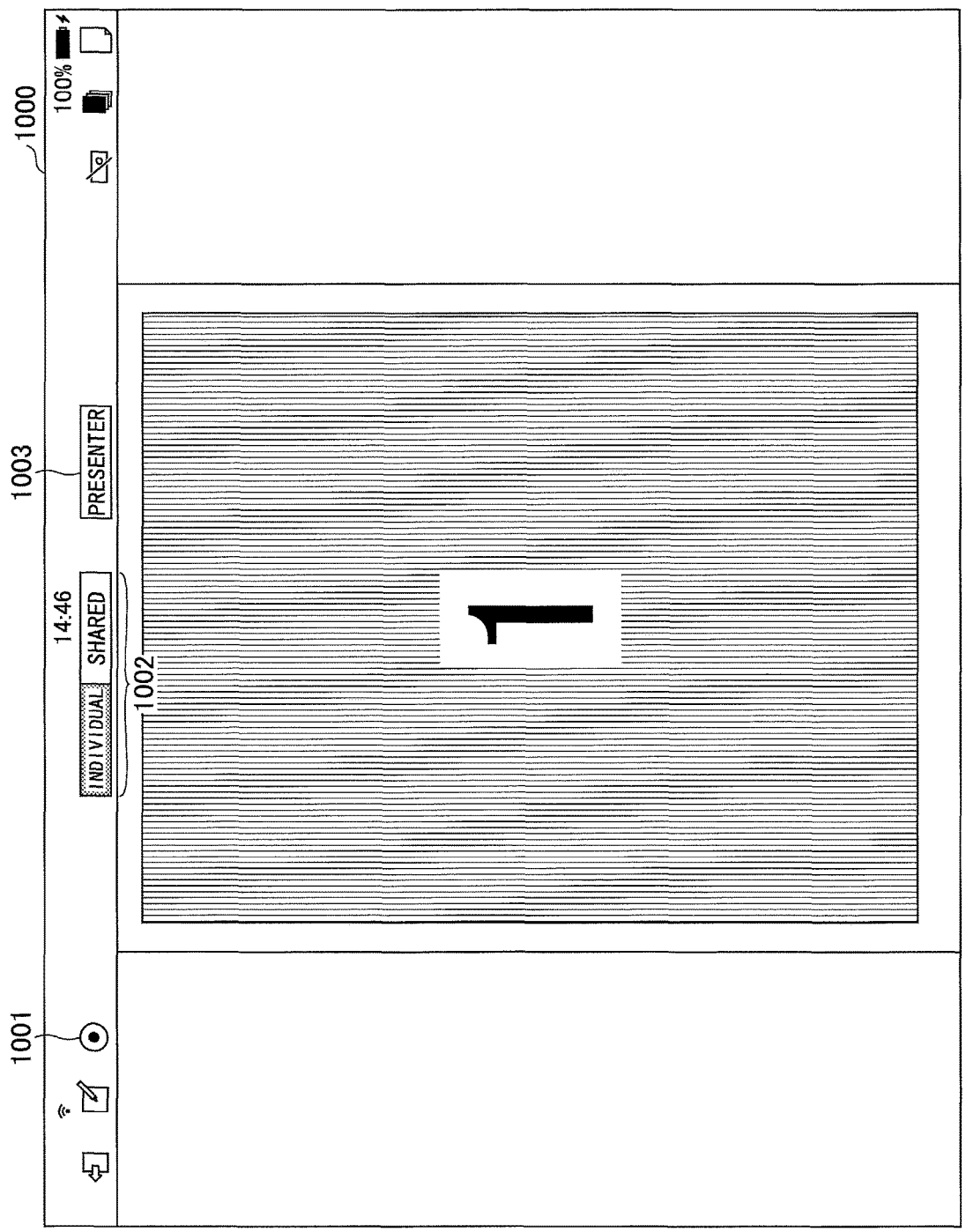
FIG. 8 illustrates an exemplary image of the individual screen in a state of picture recording.

For example, the individual screen provided with the picture recording button is as illustrated in FIGS. 7-8. FIG. 7 illustrates an exemplary image of the individual screen in the state of no picture recording. FIG. 8 illustrates an exemplary image of the individual screen in the state of picture recording.

The individual screen 1000 illustrated in FIG. 7 includes a picture recording button 1001, a mode switchover button 1002, and a presenter switchover button 1003. The operator of the meeting client apparatus 10 pushes the picture recording button 1001 of the individual screen 1000 of FIG. 7 to switch over from the state of no picture recording to the state of picture recording. Thus, the picture recording of the shared screen is started. The terminal screen display input unit 53 calls the picture recording control process of step S22 described later upon a push of the picture recording button 1001 provided on the individual screen 1000 illustrated in FIG. 7.

The operator of the meeting client apparatus 10 can perform the mode switchover between the individual mode and the shared mode by operating the mode switchover button 1002 of the individual screen 1000. The terminal screen display input unit 53 switches over between the individual mode and the shared mode by operating the mode switchover button 1002 provided on the individual screen 1000.

Further, the operator of the meeting client apparatus 10 can switch over between the participant and the presenter by operating a presenter switchover button 1003 on the individual screen 1000. The terminal screen display input unit 53 switches over the role of the meeting client apparatus 10 between the participant and the presenter by operating a presenter switchover button 1003 on the individual screen 1000.

The individual screen 1000 illustrated in FIG. 8 is switched over from the state of no picture recording to the state of picture recording when the picture recording button 1001 of the individual screen 1000 illustrated in FIG. 7 is pushed. Because the shared screen is being subjected to the picture recording, an indication of the picture recording button 1001 is changed (for example red color light is emitted). By changing the display of the picture recording button 1001, the meeting client apparatus 10 can make the operator recognize that the shared screen is being subjected to the picture recording.

The operator of the meeting client apparatus 10 pushes the picture recording button 1001 of the individual screen 1000 of FIG. 8 to switch over from the state of picture recording to the state of no picture recording. Thus, the picture recording of the shared screen is ended.

Referring to FIGS. 7-8, the example of the individual screen 1000 provided with the picture recording button 1001 is illustrated. However, the shared screen provided with the picture recording button 1001 functions in a manner similar to the above. Therefore, the explanation of the shared screen provided with the picture recording button 1001 is omitted.

<<S12: Shared Screen Generation Process>>

Figure 9:
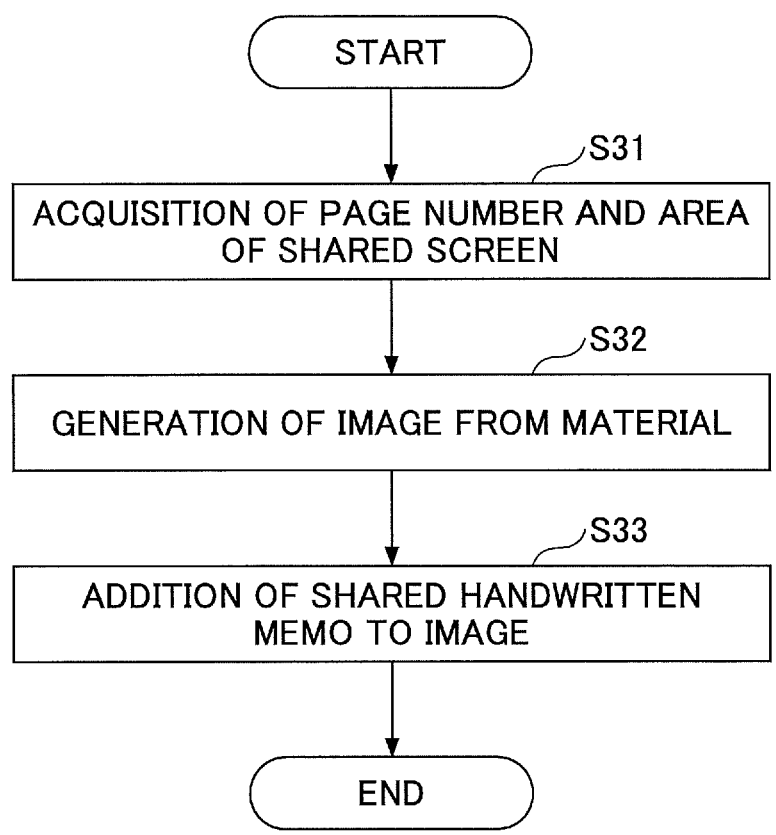
FIG. 9 is an exemplary flowchart of a shared screen generation process.

The shared screen generation process of step S12 is performed as illustrated in, for example, FIG. 9. FIG. 9 is an exemplary flowchart of the shared screen generation process. In step S31, the terminal screen display input unit 53 of the meeting client apparatus 10 acquires screen information (a material ID, a page number, a material display area, and handwritten memo information) of the shared screen from the screen information memory unit 56.

Next, in step S32, the terminal screen display input unit 53 generates an image from the meeting material identified by the material ID, the page number of the shared information, and the material display area. The process goes to step S33. In step S33, the terminal screen display input unit 53 generates the shared screen by adding the handwritten memo depicted using the handwritten memo information onto the image generated in step S32.

As described, according to the shared screen generation process of step S12, the present shared screen can be displayed on the meeting client apparatus 10 by acquiring the information of the present shared screen stored in the screen information memory unit 56.

<<S14: Shared Screen Update Process>>

Figure 10:
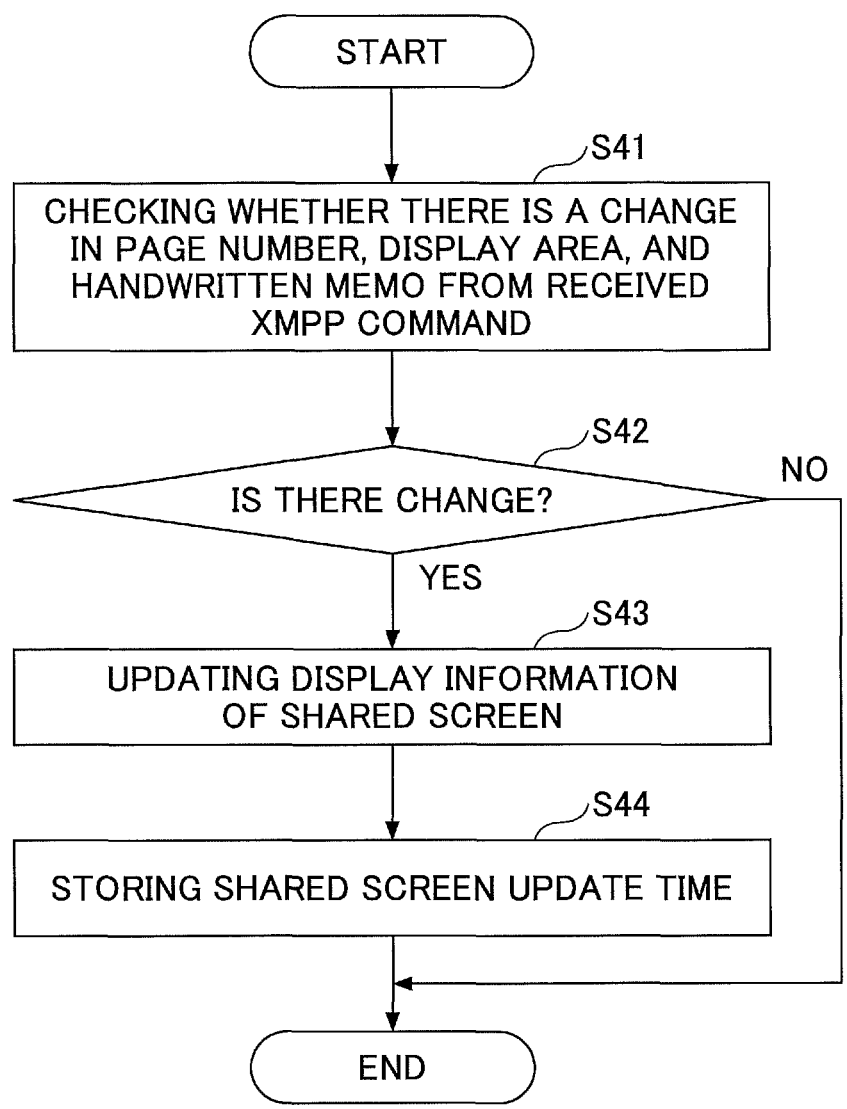
FIG. 10 is an exemplary flowchart of a shared screen update process.

The shared screen generation process of step S14 is performed as illustrated in, for example, FIG. 10. FIG. 10 is an exemplary flowchart of the shared screen update process. In step S41, the terminal screen display input unit 53 checks whether there is a change in the page number, the material display area, and the handwritten memo information, which forms screen information of the shared screen, when the terminal screen display input unit 53 receives the input operation by the presenter through the XMPP.

In step S42, if there is a change in the screen information of the shared screen, the process goes to step S43 and the terminal screen display input unit 53 performs updates the screen information of the shared screen stored in the screen information memory unit 56. Further, the process goes to step S44. The terminal screen display input unit 53 stores an update time and an update content of the shared screen in the meeting picture recording information memory unit 55.

<<S16 and S22: Picture Recording Control Process>>

Figure 11:
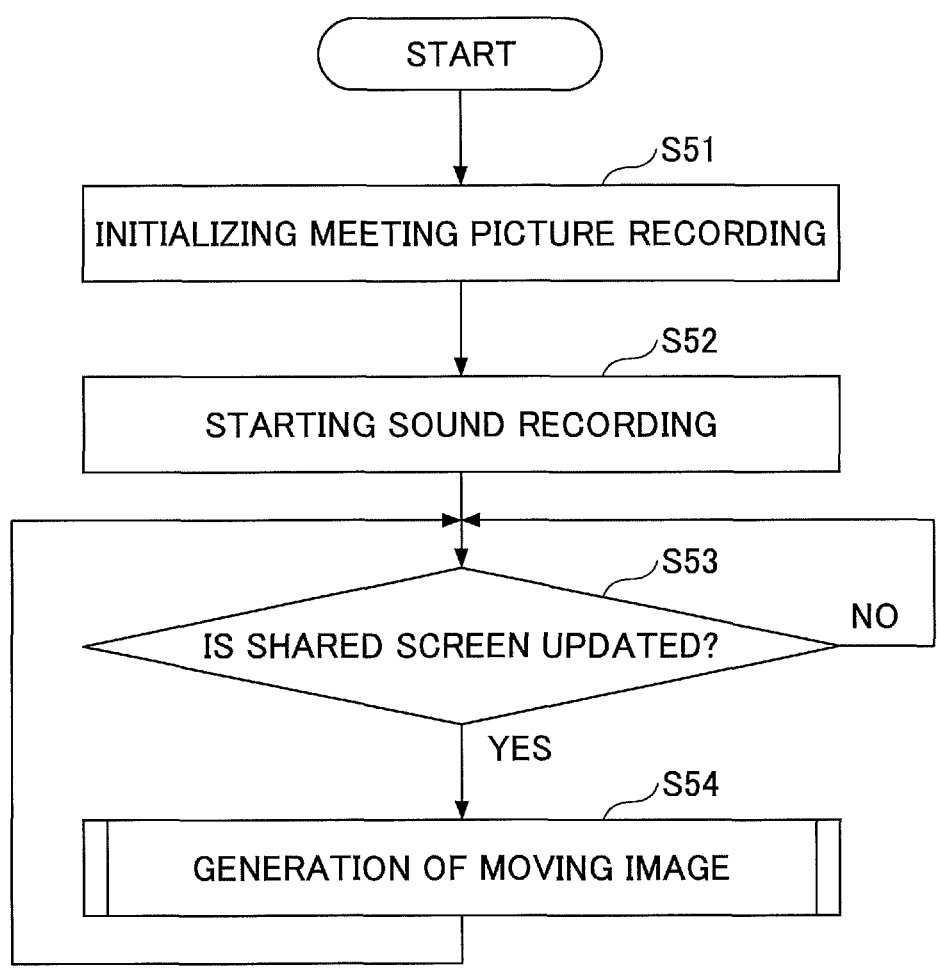
FIG. 11 is an exemplary flowchart of a picture recording control process in a case where a state of no picture recording is switched over to a state of picture recording.
Figures 13, 14:
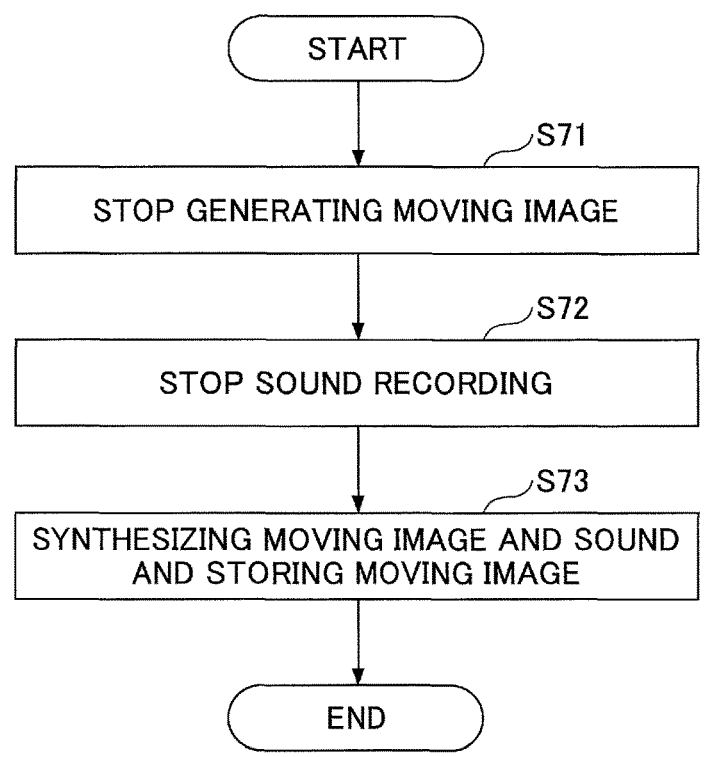
FIG. 13 illustrates an exemplary structure of a metadata inserted into a moving image.
FIG. 14 is an exemplary flowchart of the picture recording control process in a case where the state of picture recording is switched over to the state of no picture recording.

The picture recording control processes of steps S16 and S22 differ between a case where the state of no picture recording switches over to the state of picture recording and a case where the state of picture recording switches over to the state of no picture recording. In the case where the state of no picture recording switches over to the state of picture recording, the picture recording control process as illustrated in FIG. 11 is performed. In the case where the state of picture recording switches over to the state of no picture recording, the picture recording control process as illustrated in FIG. 14 is performed. FIG. 11 is an exemplary flowchart of the picture recording control process in a case where the state of no picture recording is switched over to the state of picture recording. FIG. 14 is an exemplary flowchart of the picture recording control process in a case where the state of picture recording is switched over to the state of no picture recording.

In step S51, the meeting picture recording unit 58 included in the control unit 51 of the meeting client apparatus 10 performs the initialization for recording the shared screen of the meeting. Then, the process goes to step S52, and the meeting picture recording unit 58 starts sound recording.

In step S53, the meeting picture recording unit 58 waits for an update of the shared screen and performs a moving image generation process of step S54 every update of the shared screen. The moving image generation process of step S54 is performed by a procedure illustrated in, for example, FIG. 12.

Figure 12:
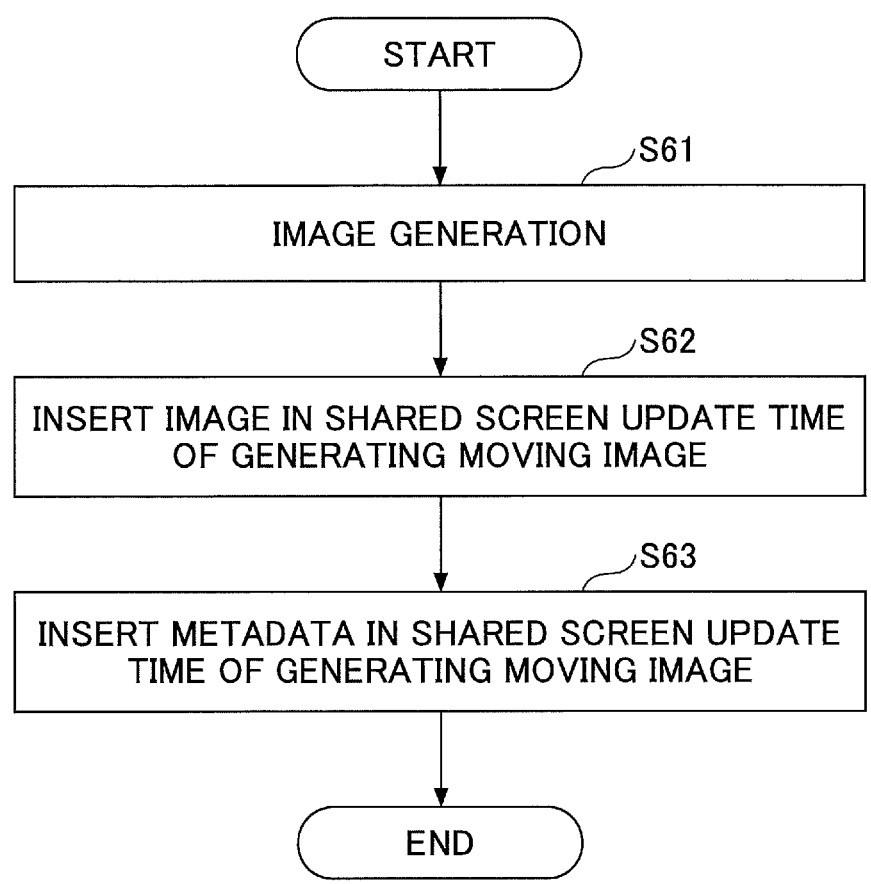
FIG. 12 is an exemplary flowchart of a moving image generation process.

FIG. 12 is an exemplary flowchart of the moving image generation process. In step S61, the meeting picture recording unit 58 generates the image of the shared screen that has been updated. In step S62, the meeting picture recording unit 58 inserts the image generated in step S61 at a timing of the update time of the shared screen stored in step S44.

By the process of step S62, the moving picture to be generated is an image generated in step S61 using an image between the update time of the shared screen stored in step S44 and the next update of the shared screen.

In step S63, the meeting picture recording unit 58 inserts metadata illustrated in FIG. 14 at a timing of the update time of the shared screen stored in step S44. FIG. 13 illustrates an exemplary structure of the metadata inserted into the moving image. The metadata illustrated in FIG. 13 have a chapter name, an order, and a start time as an item. The start time of the metadata illustrated in FIG. 13 is the update time of the shared screen stored in step S44. The metadata illustrated in FIG. 13 is used as chapter information separating the recorded moving picture.

In a case where the state of picture recording is switched over to the state of no picture recording, the meeting picture recording unit 58 included in the control unit 51 of the meeting client apparatus 10 stops the moving image generation process of the shared screen of the meeting in step S71 of FIG. 14. Then, the process goes to step S72, and the meeting picture recording unit 58 stops the sound recording. In step S73, the meeting picture recording unit 58 synthesizes the generated moving image and the recorded sound and stores the synthesized as the moving image of the shared screen of the meeting in, for example, the meeting picture recording information memory unit 55.

<<Moving Image Reproduction Process>>

Figure 15:
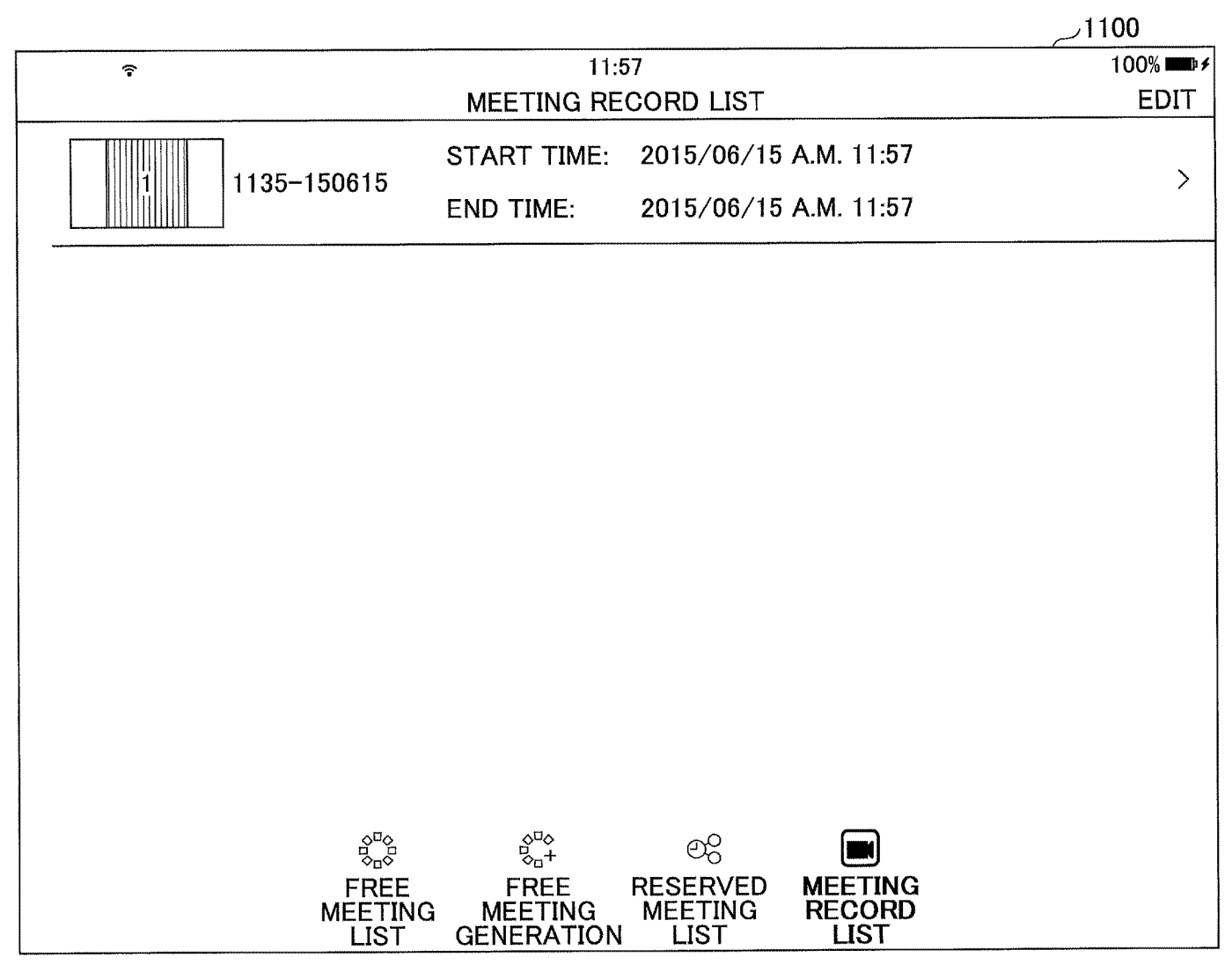

The stored moving image of the shared screen can be selected from, for example, a meeting record list as illustrated in FIG. 15 and reproduced. FIG. 15 is an exemplary image chart of the meeting record list screen. In the meeting record list screen 1100 illustrated in FIG. 15, a list of the moving images of the shared screen of the meeting provided with the picture recording upon the operation of pushing the picture recording button by the operator of the meeting client apparatus 10 as described above.

Figure 16:
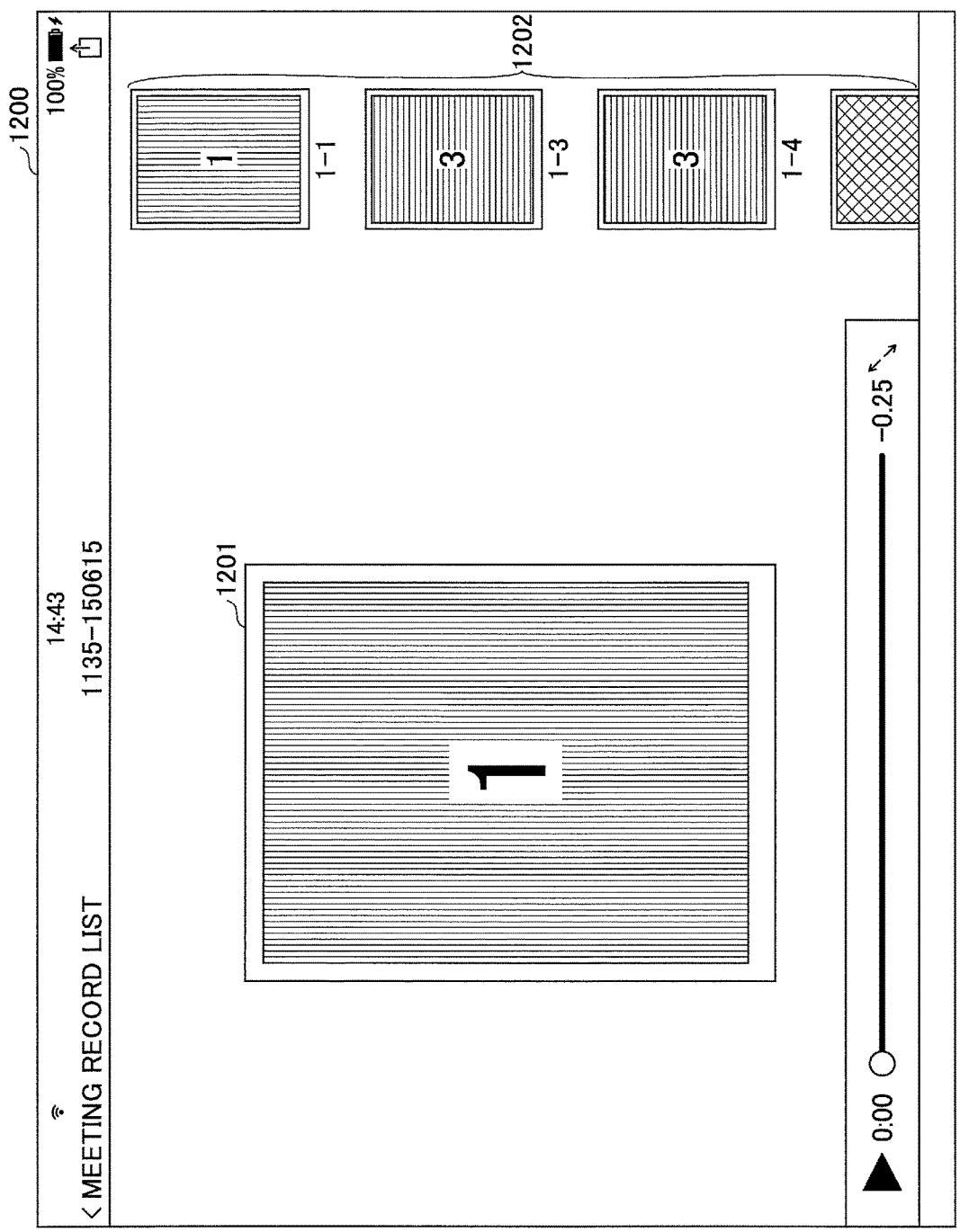
FIG. 16 illustrates an exemplary image of a reproduction screen.

The operator of the meeting client apparatus 10 can reproduce the moving images of the shared screen of the meeting on the reproduction screen as illustrated in FIG. 16 by selecting the moving image of the shared screen of the meeting required to be reproduced from the meeting record list screen 1100 illustrated in FIG. 15. FIG. 16 illustrates an exemplary image of the reproduction screen. On the reproduction screen 1200 illustrated in FIG. 16, a moving image display area 1201, on which the reproduced moving image is displayed, and chapter information 1202 are displayed.

The chapter information 1202 is generated based on metadata inserted into the moving image in step S63 and includes a thumbnail of the shared screen displayed in each chapter. For example, the operator of the meeting client apparatus 10 can cue the chapter corresponding to the thumbnail by selecting the thumbnail of the chapter information 1202.

<General Overview>

According to the meeting system 1 of the first embodiment, even in a case where the state of no picture recording switches over to the state of picture recording in the shared mode, and also even in a case where the state of no picture recording switches over to the state of picture recording in the shared mode, it is possible to perform the picture recording of the shared screen of the meeting.

Further, in the meeting system 1 of the embodiment, even if there is a mode switchover after switching over to the picture recording state as illustrated in the flow chart of FIG. 6 the picture recording state of the shared screen of the meeting is maintained. Therefore, in the meeting system 1 of the first embodiment, the shared screen of the meeting can be recorded without being influenced by a change of the display screen displayed in the meeting client apparatus 10.

Other Embodiments

Figure 17:
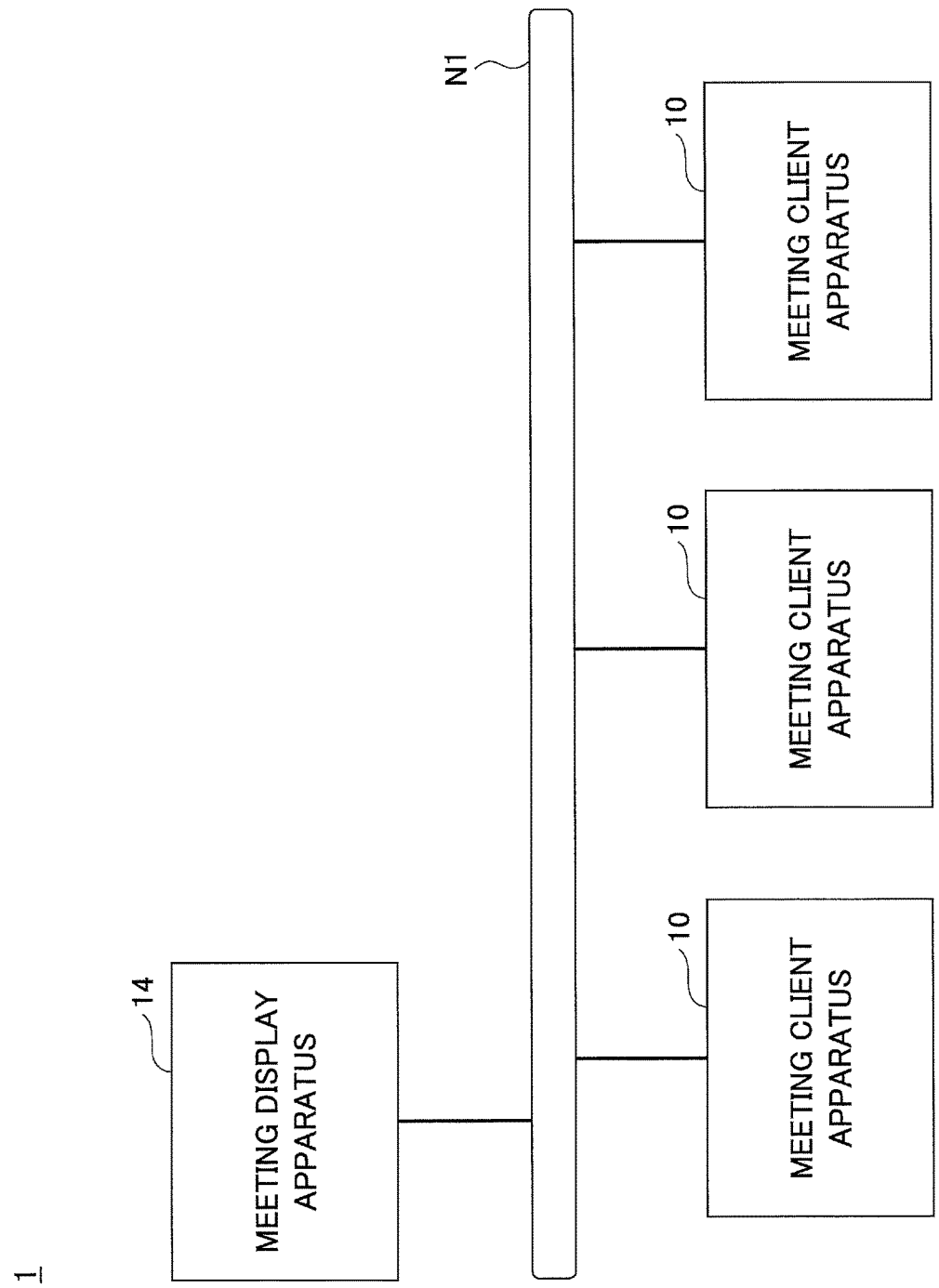
FIG. 17 illustrates another exemplary structure of the meeting system of the embodiment.

Within the first embodiment, as illustrated in FIG. 1, the meeting server apparatus 12 is used. Within another embodiment, as illustrated in FIG. 17, the meeting server apparatus 12 may be omitted. FIG. 17 illustrates another exemplary structure of the meeting system of the other embodiment. For example, the meeting system 1 illustrated in FIG. 17 may be structured such that the functions of the meeting server apparatus 12 are performed by the at least one meeting client apparatus 10 instead of the meeting server apparatus 12.

Further, although the example where the picture recording of the shared screen of the conference is performed has been described as in the flow chart of FIG. 6 in the first embodiment, for example, the meeting may be recorded each of the shared screen and the individual screen of the meeting. Further, in the first embodiment, the operator may select whether the shared screen of the meeting is recorded, whether the individual screen of the meeting is recorded, or whether each of the shared screen and the individual screen of the meeting is recorded at a time of starting the picture recording.

Second Embodiment

Within a second embodiment, the user who can perform the picture recording of the meeting is administered using a picture recording authority. Within the second embodiment, an access control for the moving image of the shared screen and the individual screen of the recorded meeting is performed. Because the second embodiment is similar to the first embodiment except for a part of the second embodiment, explanation is appropriately omitted.

Figure 18:
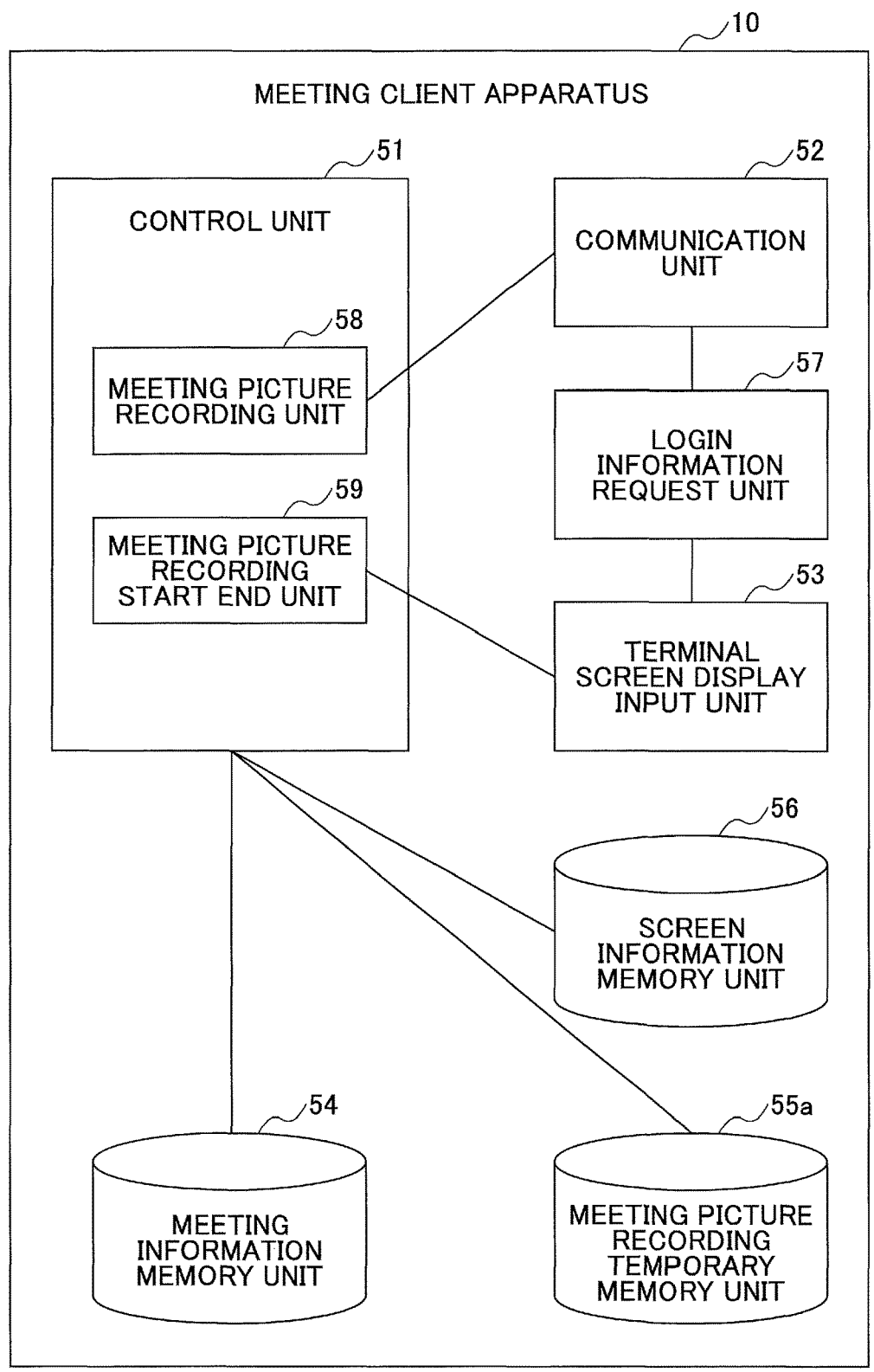
FIG. 18 is another exemplary functional block diagram of the meeting client apparatus.

FIG. 18 is another exemplary functional block diagram of the meeting client apparatus. The meeting client apparatus 10 illustrated in FIG. 18 substantializes a control unit 51, a communication unit 52, a terminal screen display input unit 53, a meeting information memory unit 54, a meeting picture recording temporary memory unit 55*a*, a screen information memory unit 56, and a login information request unit 57 by executing the program. The control unit 51 includes a meeting picture recording unit 58 and meeting picture recording start end unit 59. The meeting picture recording temporary memory unit 55*a* and the login information request unit 57 are described in detail later.

Figure 19:
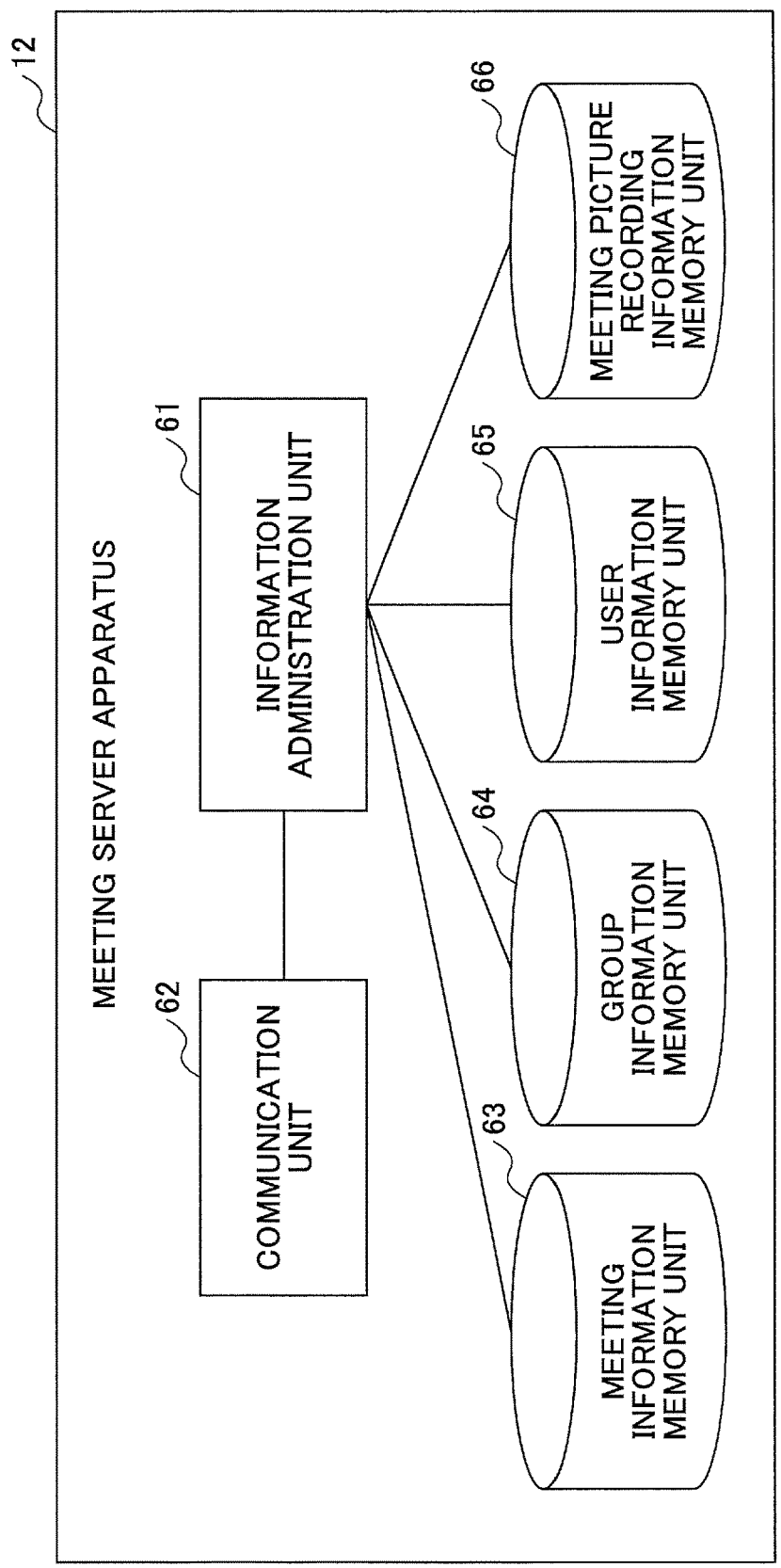
FIG. 19 is another exemplary functional block diagram of the meeting server apparatus.

FIG. 19 is another exemplary functional block diagram of the meeting server apparatus. The meeting server apparatus 12 illustrated in FIG. 19 substantializes an information administration unit 61, a communication unit 62, a meeting information memory unit 63, a group information memory unit 64, a user information memory unit 65, and a meeting picture recording information memory unit 66 by executing the program.

For example, the group information memory unit 64 stores group information as illustrated in FIG. 20. FIG. 20 illustrates a structure of exemplary group information. In the group information illustrated in FIG. 20, a group name and a user list are stored while associating the group name with the user list. The group name is exemplary identification information uniquely identifying the group. The user list is exemplary identification information list uniquely identifying the user belonging to the group.

In the group information illustrated in FIG. 20, it is possible to set such that multiple users belong to one group. Further, in the group information illustrated in FIG. 20, it is possible to set such that a certain user belongs to multiple groups.

For example, the group information memory unit 65 stores user information as illustrated in FIG. 21. FIG. 21 illustrates a structure of exemplary user information. Referring to FIG. 21, in the user information, the user name and the password are stored while associating the user name and the password. The user name is exemplary identification information uniquely identifying the user. The password is exemplary secret information associated with the user name.

Further, the meeting information memory unit 63 stores meeting information as illustrated in FIG. 22. FIG. 22 illustrates a structure of exemplary meeting information.

In the meeting information illustrated in FIG. 22, a meeting ID, a meeting name, a start time, a meeting material, an access enabled group, and a picture recording enabled group are stored while associating these. The meeting ID is exemplary identification information uniquely identifying the meeting. The meeting name is the name of the meeting. The start time is a time and date when the meeting is started. The meeting material is a meeting material used the meeting.

The access enabled group indicates a group name of a group which can access the meeting. A user belonging to a group indicated as the access enabled group can access the meeting. In the meeting information DB, multiple groups can be set as the access enabled group relative to the first meeting. The access enabled group indicates a group name of a group which can access the meeting. A user belonging to the group indicated as the picture recording enabled group can undergo picture recording of the meeting.

Further, the meeting picture recording information memory unit 66 stores meeting picture recording information as illustrated in FIG. 23. FIG. 23 illustrates an exemplary structure of the meeting picture recording information.

In the meeting picture recording information illustrated in FIG. 23, a picture recording ID, a picture recording user, a meeting ID, a picture recording start time, a picture recording end time, a type, and picture recording data are stored while associating these. The picture recording ID is exemplary identification information uniquely identifying the picture recording. The picture recording user is the user name of a user who undergoes the picture recording. The meeting ID is exemplary identification information uniquely identifying the meeting. The picture recording start time is a time and date when the picture recording is started. The picture recording end time is a time and date when the picture recording is ended. The type is information indicative whether the picture recording of the shared screen or the picture recording of the individual screen. The picture recording data is information indicative of a file of the recorded moving image.

Figure 24:
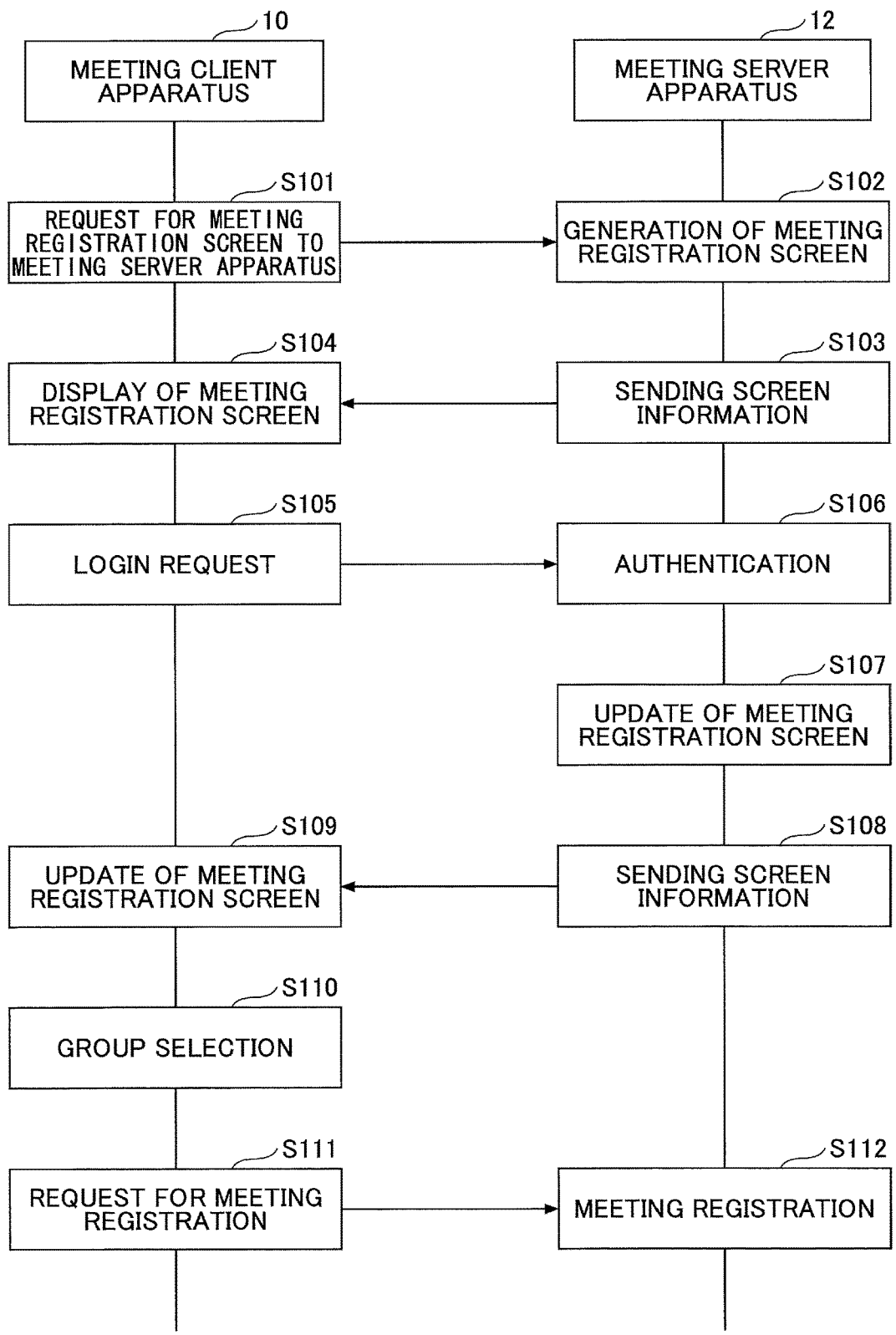
FIG. 24 is an exemplary flowchart of a meeting picture recording information.

FIG. 24 is an exemplary flowchart of a meeting registration process. The organizer and/or presenter of the meeting is required to register information such as meeting information and meeting material into the meeting server apparatus 12 before opening the meeting.

In step S101, the organizer or presenter of the meeting operates the meeting client apparatus 10 to instruct that the meeting registration screen is displayed. The terminal screen display input unit 53 of the meeting client apparatus 10 requests the meeting server apparatus 12 to display the meeting registration screen.

In step S102, because the user does not log in, the information administration unit 61 of the meeting server apparatus 12 generates the meeting registration screen before the login. In step S103, the information administration unit 61 sends the screen information of the generated meeting registration screen before the login to the meeting client apparatus 10.

In step S104, the terminal screen display input unit 53 of the meeting client apparatus 10 displays the meeting registration screen before the login based on the screen information of the meeting registration screen before the login, which is received from the meeting server apparatus 12. The meeting information can be registered in the meeting information memory unit 63 of the meeting server apparatus 12 when the organizer or presenter of the meeting designates the meeting information and the material information in the meeting registration screen before the login and instructs a meeting registration.

In a case where a meeting, in which the access enabled group and the picture recording enabled group are set, is required to be registered, the organizer and the presenter conduct a meeting registration after a login process. In step S105, the organizer or presenter of the meeting operates the meeting client apparatus 10 to instruct the login by inputting the user name and the password. The login information request unit 57 of the meeting client apparatus 20 sends a login request to the meeting server apparatus 12.

In step S106, the information administration unit 61 of the meeting server apparatus 12 performs the authentication based on the login request from the meeting client apparatus 10. If the authentication is successfully completed, the information administration unit 61 of the meeting server apparatus 12 performs step S107. Because the user logs in, the information administration unit 61 generates a meeting registration screen after the login. In step S108, the information administration unit 61 sends the screen information of the generated meeting registration screen after the login to the meeting client apparatus 10.

In step S109, the terminal screen display input unit 53 of the meeting client apparatus 10 displays the meeting registration screen 1300 after the login based on the screen information of the meeting registration screen 1300 after the login, which is received from the meeting server apparatus 12.

FIG. 25 is an exemplary image chart of the meeting registration screen after login. In the meeting registration screen 1300, input columns for the meeting name, the start time, the meeting material, the access enabled group, and the picture recording enabled group are included. In step S110, the organizer or presenter of the meeting performs the meeting registration through the meeting registration screen 1300 after the login. The meeting registration done in step S110 includes a selection between the access enabled group and the picture recording enabled group. In step S110, the organizer or presenter of the meeting performs the meeting registration through the meeting registration screen 1300 after the login.

The terminal screen display input unit 53 sends a meeting registration request designating information such as the meeting name, the start time, the meeting material, the access enabled group, and the picture recording enabled group to the meeting server apparatus 12. In step S112, the information administration unit 61 of the meeting server apparatus 12 receives the meeting registration request designating the meeting information such as the meeting name, the start time, the meeting material, the access enabled group, and the picture recording enabled group, and registers the meeting information into the meeting information memory unit 63.

FIG. 26 is a sequence diagram of an exemplary process of picture recording of the meeting. In step S121, the presenter or participant of the meeting operates the meeting client apparatus 10 to instruct the login by inputting the user name and the password. The login information request unit 57 of the meeting client apparatus 10 sends a login request to the meeting server apparatus 12, and receives an authentication result. Here, the description is given on the premise that the authentication is successful.

In step S122, the terminal screen display input unit 53 of the meeting client apparatus 10 requests the meeting server apparatus 12 to send the meeting information of the meeting, to which the authentication is acquired so as to enable participation of the presenter or participant. The information administration unit 61 of the meeting server apparatus 12 refers to the meeting information illustrated in FIG. 22 and selects the meeting, in which the group name including the successfully authenticated presenter or participant (user) is set as the access enabled group, and the meeting without an access limitation.

The information administration unit 61 of the meeting server apparatus 12 returns the meeting information of the selected meeting to the meeting client apparatus 10. The meeting information returned to the meeting client apparatus 10 includes information necessary for the meeting participation such as the meeting information illustrated in FIG. 22, information indicative of existence of the picture recording authority, and so on. The meeting picture recording start end unit 59 of the meeting client apparatus 10 can determine whether the picture recording authority of the successfully authenticated user exists by referring to the picture recording enabled group included in the meeting information. For example, the meeting picture recording start end unit 59 determines that the picture recording authority exists in a case where the group name, to which the successfully authenticated user belongs, is set as the picture recording enabled group.

Here, explanation is given on the premise that the user operates the meeting client apparatus 10 to participate in the meeting for which the picture recording authority is given. When the user pushes, for example, the picture recording button on the individual screen 1000 illustrated in FIG. 7, it is possible to request for picture recording of the individual screen 1000. Further, the user can request for the picture recording the shared screen by pushing the picture recording button 1001 of the shared screen.

When the picture recording is requested from the user having the picture recording, the meeting picture recording unit 58 of the meeting client apparatus 10 starts the picture recording for the individual screen 1000 or the shared screen of the participating meeting and stores the picture recording data in the meeting picture recording temporary memory unit 55*a*.

When the user pushes the picture recording button 1001 on the individual screen 1000 illustrated in, for example, FIG. 8, it is possible to request to stop the picture recording of the individual screen 1000. Further, the user can request for the stop of the picture recording the shared screen by pushing the picture recording button 1001 of the shared screen.

When the stop of the picture recording is requested, the meeting picture recording unit 58 of the meeting client apparatus 10 stops the picture recording for the individual screen 1000 or the shared screen of the participating meeting. In step S124, the meeting picture recording start end unit 59 of the meeting client apparatus 10 the picture recording data stored in the meeting picture recording temporary memory unit 55*a* upload to the meeting server apparatus 12.

The information administration unit 61 of the meeting server apparatus 12 stores the uploaded picture recording data into the meeting picture recording information memory unit 66 as the meeting picture recording information illustrated in FIG. 23. In step S125, the meeting picture recording start end unit 59 of the meeting client apparatus 10 deletes the uploaded picture recording data from the meeting picture recording temporary memory unit 55*a*.

As such, the user having the picture recording authority can undergo the picture recording of the individual screen 1000 or the shared screen of the meeting in which the user participates. It is possible to determine whether the picture recording authority exists after the picture recording button 1001 is pushed. It is possible to determine whether the picture recording authority exists before the picture recording button 1001 is pushed. When it is determined whether the picture recording authority exist before the picture recording button 1001 is pushed, it may be possible not to accept a push of the picture recording button 1001.

Figure 27:
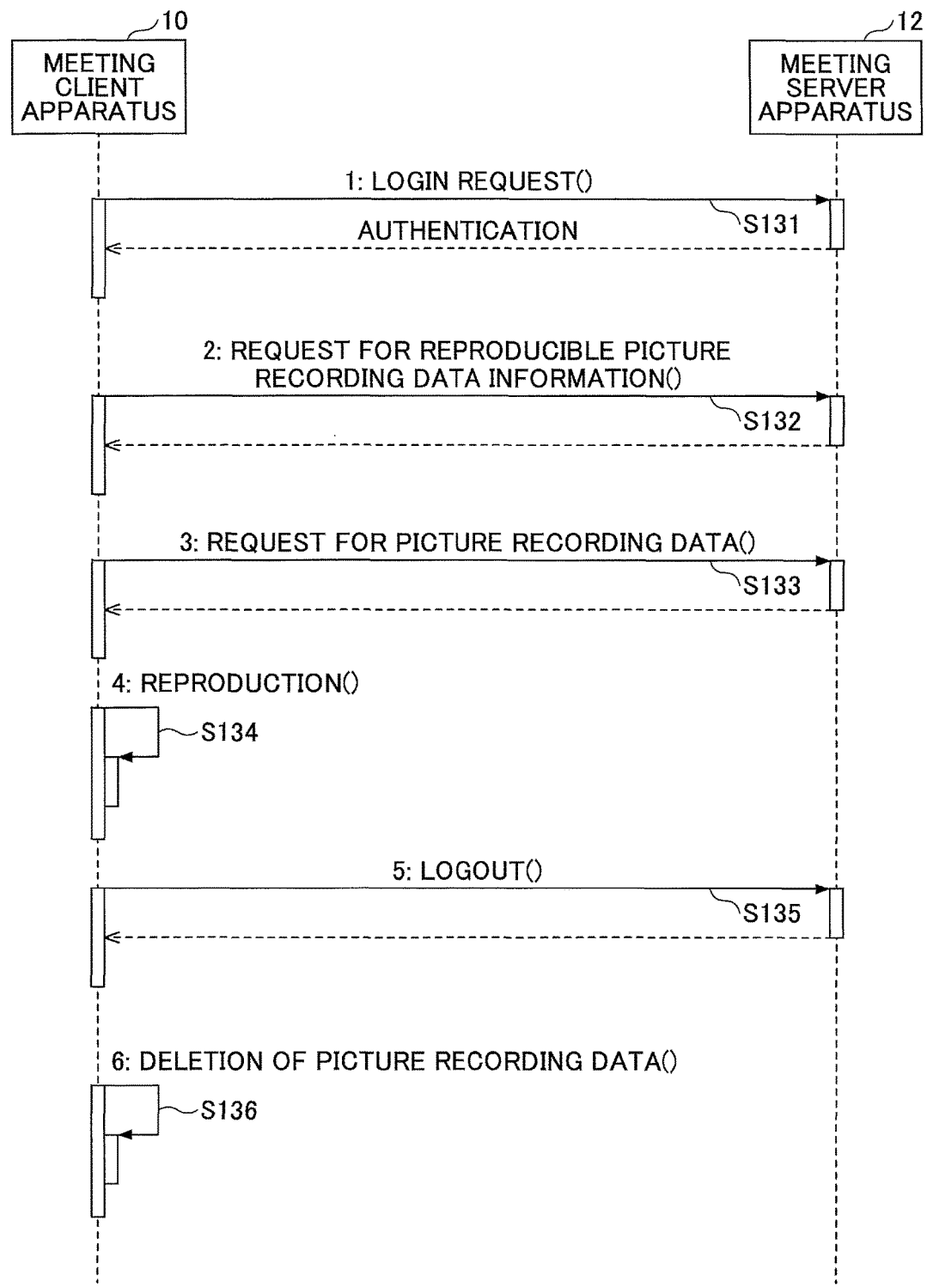
FIG. 27 is a sequence diagram of an exemplary process of controlling an access to picture recording data.

FIG. 27 is a sequence diagram of an exemplary process of controlling an access to the picture recording data. In step S131, the user operates the meeting client apparatus 10 to instruct the login by inputting the user name and the password. The login information request unit 57 of the meeting client apparatus 10 sends a login request to the meeting server apparatus 12, and receives an authentication result. Here, the description is given on the premise that the authentication is successful.

In step S132, the terminal screen display input unit 53 of the meeting client apparatus 10 requests the meeting server apparatus 12 to send information of the picture recording data which can be reproduced by the successfully authenticated user. The information administration unit 61 of the meeting server apparatus 12 returns the information, which is selected from the meeting picture recording information illustrated in FIG. 23, of the picture recording data which can be reproduced by the successfully authenticated user to the meeting client apparatus 10. A detailed process of selecting information of the picture recording data that can be reproduced by the successfully authenticated user by the information administration unit 61 is described later.

When the terminal screen display input unit 53 of the meeting client apparatus 10 receives the information of the picture recording data that can be reproduced by the successfully authenticated user the terminal screen display input unit 53 displays a picture recording list screen 1400 illustrated in, for example, FIG. 28. FIG. 28 is an exemplary image chart of the picture recording list screen. In the picture recording list screen 1400, a picture recording list 1401 is displayed.

The picture recording list 1401 lists the information of the picture recording data that can be reproduced by the successfully authenticated user. The picture recording list 1401 illustrated in FIG. 28 includes a picture recording ID, a meeting name, a picture recording user, a picture recording start time, and a type.

In step S133, the user operates the meeting client apparatus 10 to select the picture recording data from the picture recording list 1401. Then, a reproduction button is pushed, for example. The terminal screen display input unit 53 of the meeting client apparatus 10 requests the meeting server apparatus 12 to send the picture recording data selected by the user. The information administration unit 61 of the meeting server apparatus 12 returns the requested meeting information of the selected meeting to the meeting client apparatus 10.

The process goes to step S134. In step S134, the terminal screen display input unit 53 of the meeting client apparatus 10 reproduces the picture recording data returned from the meeting server apparatus 12. As such, the meeting client apparatus 10 can acquire and reproduce the picture recording data stored in the meeting picture recording information memory unit 66 of the meeting server apparatus 12.

After reproducing the picture recording data, the user operates the meeting client apparatus 10 to request for a logout request to the meeting server apparatus 12. Thus, the meeting client apparatus 10 can log out. In step S136, the terminal screen display input unit 53 of the meeting client apparatus 10 deletes the picture recording data acquired from the meeting server apparatus 12.

Figure 29:
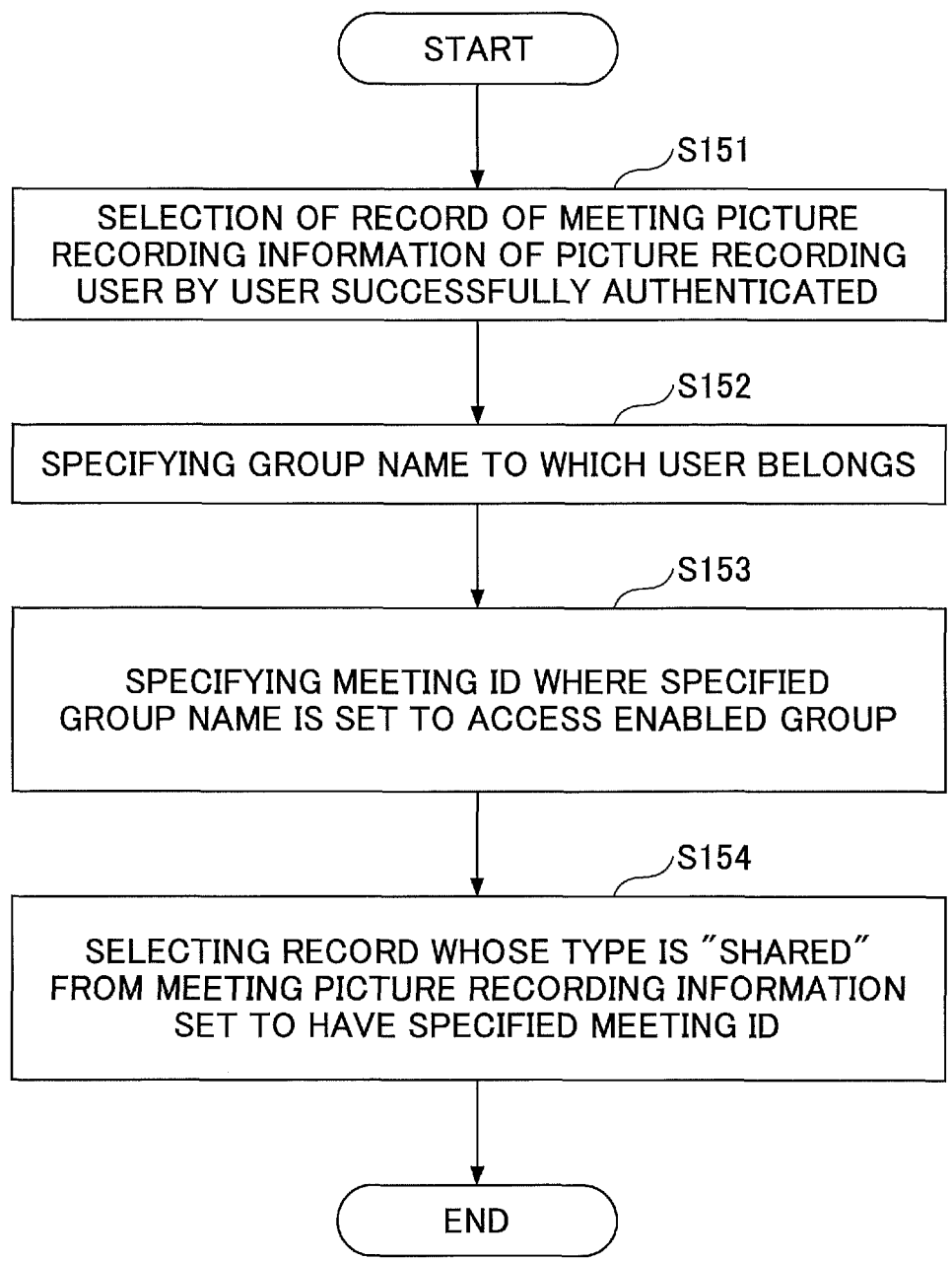
FIG. 29 is an exemplary flowchart of a process of selecting information of a picture recording data that can be reproduced by the successfully authenticated user.

The process of the information administration unit 61 of selecting the information of the picture recording data that can be reproduced by the successfully authenticated user is done as illustrated in, for example, FIG. 29. FIG. 29 is an exemplary flowchart of the process of selecting the information of the picture recording data which can be reproduced by the successfully authenticated user.

The process goes to step S151. In step S151, the information administration unit 61 of the information administration unit 61 refers to the meeting picture recording information and selects the record of the meeting picture recording information, for which the successfully authenticated user is set to be a picture recording user.

The process goes to step S152. In step S152, the information administration unit 61 refers to the group information illustrated in FIG. 20 and specifies the group name to which the user belongs. In, for example, the group information illustrated in FIG. 20, if the successfully authenticated user name is "AA", the group name "Group1" is specified.

The process goes to step S153. In step S153, the information administration unit 61 refers to the meeting information illustrated in FIG. 22 and specifies the meeting ID, in which the group name specified in step S152 is set to the access enabled group.

The process goes to step S154. In step S154, the information administration unit 61 refers to the meeting picture recording information illustrated in FIG. 23 and selects the record whose type is "shared" among from the records, in which the meeting ID specified in step S153. The record selected in step S154 becomes the information of the picture recording data which can be reproduced by the successfully authenticated.

By the flowchart illustrated in FIG. 29, the successfully authenticated user can acquire and reproduce the picture recording data recording the shared screen from among the record of the meeting picture recording information, in which the group including the successfully authenticated user is set as the access enabled group.

Referring to the flowchart illustrated in FIG. 29, the successfully authenticated user can acquire and reproduce the picture recording data of the individual screen 1000 which has undergone the picture recording by the successfully authenticated user. Referring to the flowchart illustrated in FIG. 29, the successfully authenticated user cannot acquire and reproduce the picture recording data of the individual screen 1000 which has undergone the picture recording by a person other than the successfully authenticated user.

The picture recording list 1401 of the picture recording list screen 1400 illustrated in FIG. 28 includes the picture recording data having the types of "shared" and "individual". However, a switchover button for switching over the type of the displayed picture recording data every push of the switchover button may be provided. The picture recording list screen 1400 illustrated in FIG. 28 may display a picture recording list including picture recording whose type is "shared" and a picture recording list including picture recording whose type is "individual" using, for example, a tag.

Further, in the sequence diagrams illustrated in FIGS. 26-27, it is possible to delete the picture recording data from the meeting client apparatus 10 by storing the picture recording data in the meeting server apparatus 12. Because the meeting client apparatus 10 deletes the picture recording data from the meeting client apparatus 10 after logging out or uploading the picture recording data, for example, in a case where the meeting client apparatus 10 is shared, the security can be improved.

<General Overview>

In the meeting system 1 of the second embodiment, the security can be improved because the user who undergoes the picture recording of the meeting can be controlled depending on picture recording authority. Therefore, the security can be improved. In the meeting system 1 of the second embodiment, an access control for the moving image of the shared screen and the individual screen of the recorded meeting is performed. For example, in the meeting system 1 of the second embodiment, the user can reproduce the picture recording data recorded by another user belonging to the same group. Further, in the meeting system 1 of the second embodiment, the user can reproduce the picture recording data by another meeting client apparatus 10 other than the meeting client apparatus 10 with which the meeting has undergone the picture recording.

Third Embodiment

Within a third embodiment, in a case where an agenda is set to a meeting, the meeting undergoes the picture recording for each agenda. Because the third embodiment is similar to the first embodiment except for a part of the third embodiment, explanation is appropriately omitted.

FIG. 30 illustrates a structure of exemplary meeting information. In the meeting information illustrated in FIG. 30, a meeting ID, a meeting name, a start time, a meeting state, and existence or nonexistence of agenda are stored while associating these. The meeting ID is exemplary identification information uniquely identifying the meeting. The meeting name is the name of the meeting. The start time is a time and date when the meeting is started. The meeting state indicates a state of the meeting such as before open, ongoing, and after open. The existence or nonexistence of the agenda indicates existence or nonexistence of agenda registration in the meeting.

FIG. 31 illustrates a structure of exemplary agenda information. The agenda information illustrated in FIG. 31 is stored in, for example, the meeting information memory unit 54. The agenda information illustrated in FIG. 31 includes an agenda ID, a meeting ID, an agenda name, a presenter, a presentation time, and so on. The agenda ID is exemplary identification information uniquely identifying the agenda. The meeting ID is exemplary identification information uniquely identifying the meeting.

Each record of the agenda information corresponds to the meeting information illustrated in FIG. 30 through the meeting ID. The agenda name is the name of the agenda. The presenter indicates the name of the presenter associated with the agenda. The presentation time is associated with the agenda.

FIG. 32 illustrates an exemplary structure of the meeting picture recording information. In the meeting picture recording information illustrated in FIG. 32, the picture recording ID, the agenda ID, the picture recording user, the meeting ID, a picture recording start time, a picture recording end time, the type, and the picture recording data are stored while associating these. The meeting picture recording information is formed by adding the agenda ID to the meeting picture recording information illustrated in FIG. 23. The agenda ID is exemplary identification information uniquely identifying the agenda. Each record of the meeting picture recording information is associated with the agenda information illustrated in FIG. 31 by the agenda ID.

Within the third embodiment, an input operation of the presenter is reported upon a receipt of the XMPP command illustrated in, for example, FIG. 33. FIG. 33 illustrates an exemplary structure of the XMPP command. The agenda ID is included in the XMPP command. Therefore, the meeting client apparatus 10 receiving the XMPP command illustrated in FIG. 33 can detect that the agenda changes when the agenda ID changes.

<<S14: Shared Screen Update Process>>

Figure 34:
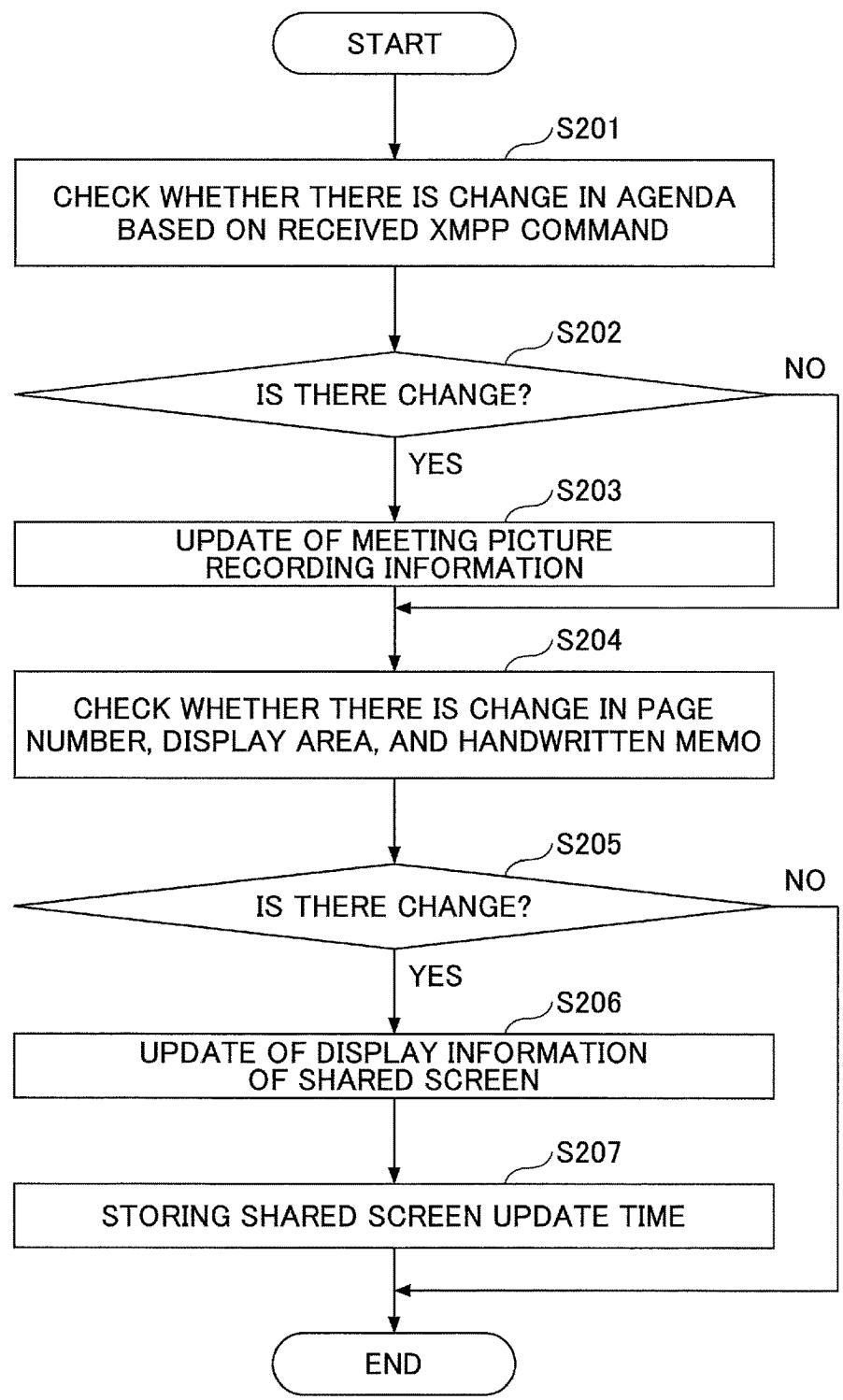
FIG. 34 is another exemplary flowchart of the shared screen update process.

The shared screen generation process of step S14 is performed as illustrated in, for example, FIG. 34. FIG. 34 is another exemplary flowchart of the shared screen update process. In step S201, the terminal screen display input unit 53 checks whether the agenda changes by referring to the agenda ID included in the XMPP command when the input operation of the XMPP command by the presenter is received.

If there is a change in the agenda, the terminal screen display input unit 53 proceeds to step S203 and updates the meeting picture recording information illustrated in FIG. 32. For example, the terminal screen display input unit 53 updates the record of the meeting picture recording information corresponding to the agenda ID before the change. For example, the terminal screen display input unit 53 updates the record of the meeting picture recording information corresponding to the agenda ID after the change.

After the process of step S203 or when there is no change in the agenda in step S202, the process proceeds to step S204 and the terminal screen display input unit 53 checks whether there is a change in a page number, a material display area, and handwritten memo information, which form the image information of the shared screen.

In step S205, if there is a change in the screen information of the shared screen, the process goes to step S206 and the terminal screen display input unit 53 updates the screen information of the shared screen stored in the screen information memory unit 56. Further, the process goes to step S207. The terminal screen display input unit 53 stores an update time and an update content of the shared screen in the meeting picture recording information memory unit 55.

<<S54: Moving Image Generation Process>>

Figure 35:
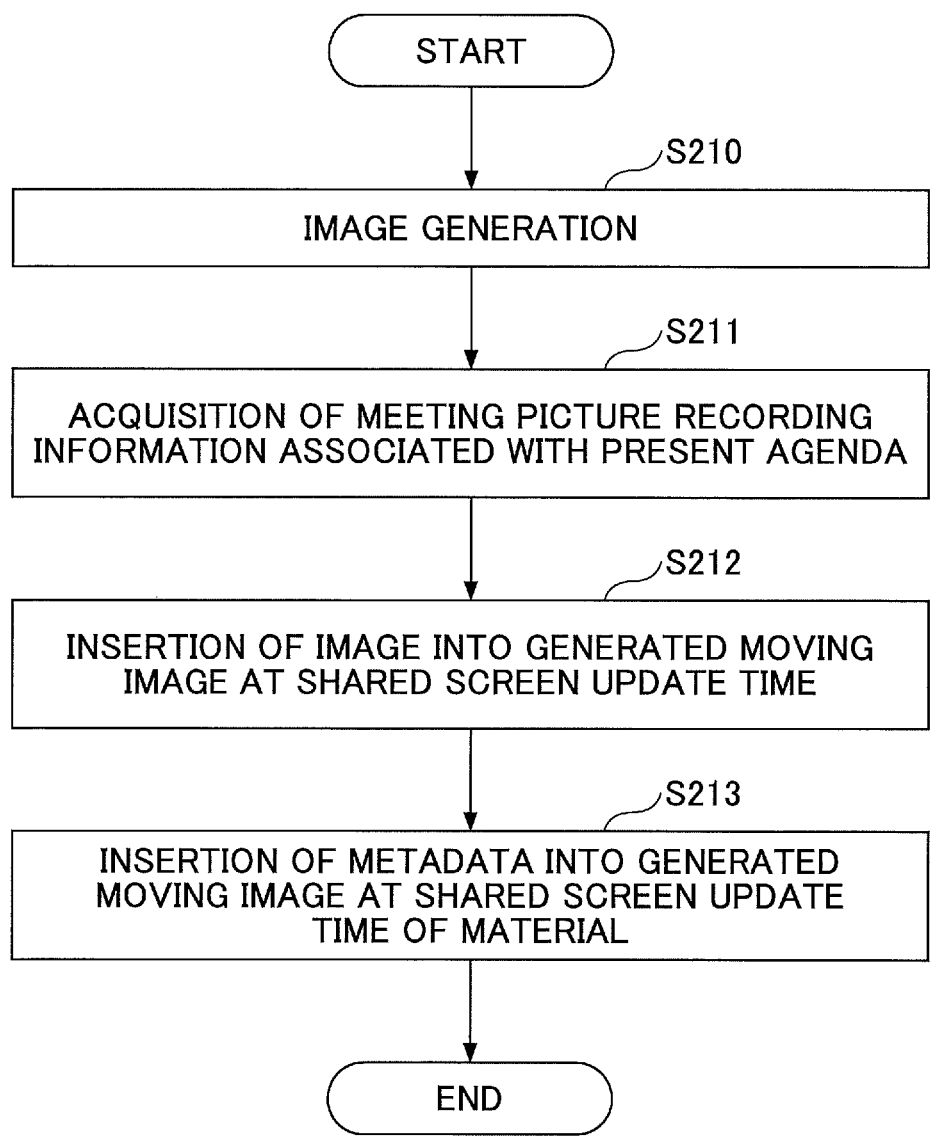
FIG. 35 is another exemplary flowchart of the moving image generation process.

The moving image generation process of step S54 is performed by a procedure illustrated in, for example, FIG. 35. FIG. 35 is another exemplary flowchart of the moving image generation process. In step S210, the meeting picture recording unit 58 generates the image of the shared screen that has been updated.

The process goes to step S211. The meeting picture recording unit 58 acquires the meeting picture recording information (FIG. 32) associated with the present agenda. In step S212, the meeting picture recording unit 58 inserts the image generated in step S210 at a timing of the update time of the shared screen stored in step S207.

By the process of step S212, the generated moving picture is an image generated in step S210 using an image between the update time of the shared screen stored in step S207 and the next update of the shared screen. In step S213, the meeting picture recording unit 58 inserts meta data illustrated in FIG. 13 at a timing of the update time of the shared screen stored in step S207.

<<Moving Image Reproduction Process>>

The stored moving image of the shared screen can be selected from, for example, the meeting record list as illustrated in FIG. 15 and reproduced. In the meeting record list screen 1100 illustrated in FIG. 15, the list of the moving images of the shared screen of the meeting provided with the picture recording upon the operation of pushing the picture recording button by the operator of the meeting client apparatus 10 as described above.

The operator of the meeting client apparatus 10 can display the agenda selection screen 1500 as illustrated in FIG. 36 by selecting the moving image of the shared screen of the meeting required to be reproduced from the meeting record list screen 1100 illustrated in FIG. 15.

FIG. 36 illustrates an exemplary image of the agenda selection screen. The agenda selection screen 1500 illustrated in FIG. 36 displays an agenda list corresponding a meeting selected from the meeting record list screen 1100. The operator of the meeting client apparatus 10 can select an agenda of reproducing the moving image of the shared screen of the meeting using the agenda selection screen 1500. The operator of the meeting client apparatus 10 can select an agenda of reproducing the moving image of the shared screen of the meeting to be reproduced from the agenda selection screen 1500 illustrated in FIG. 36. Within the third embodiment, an example of the picture recording of the moving image of the shared screen of the meeting in a unit of each agenda has been described. Here, the moving image of the individual screen 1000 may be recorded in the unit of each agenda.

<General Overview>

In the meeting system 1 of the third embodiment, the picture recording data are switched over for each agenda of the meeting. Therefore, the moving image of the shared screen and the individual screen 1000 can undergo the picture recording in the unit of each agenda.

The present invention is not limited to the specifically disclosed embodiments, and variations and modifications may be made without departing from the scope of the present invention. The meeting client apparatus 10 is an example of the terminal apparatus. The terminal screen display input unit 53 is an example of an image display input unit 53. The meeting picture recording unit 58 is an example of an image record unit. A meeting system 1 is an example of an information processing system.

The meeting system 1 including the meeting client apparatus 10, the meeting server apparatus 12, and the meeting display apparatus 14 is an example. Various examples of a system structure may be applicable depending on a use or a purpose. An operation of pushing the picture recording button is an example of a screen record operation. The input operation by the presenter delivered by the XMPP is an example of operation information delivered to display the first screen. The presenter is an example of a first operator. The participant is an example of a second operator.

According to the embodiment, there is provided an information processing system including a terminal apparatus of switching over a first mode, in which a first screen being in synchronization with another terminal apparatus is displayed, and second mode, in which a second screen being in desynchronization with the another terminal apparatus is displayed, upon a mode switchover operation by an operator, the information processing system comprising:

a first terminal apparatus operated by a first operator who can update the first screen; and a second terminal apparatus operated by a second operator who is not the first operator, wherein the second terminal apparatus includes a processor configured to receive a mode switchover operation between the first mode and the second mode by the operator and display the first screen of the first mode or the second screen of the second mode, which is switched over by the mode switchover operation; and to receive a screen recording operation by the operator and record the first screen or the second screen for each of the first and second modes regardless of the display of the first screen of the first mode or the second screen of the second mode by the screen display input unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The CPU may be implemented by only one processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

This application is based upon and claims the benefit of priority of the prior Japanese Patent Application No. 2015-130278, filed on Jun. 29, 2015, and the Japanese Patent Application No. 2015-222331, filed on Nov. 12, 2015, the entire contents of which are incorporated herein by reference.

What is claimed is:

1. A terminal apparatus that operates in a sharing display mode, in which screen information of a meeting material is synchronously displayed on a display of the terminal apparatus and a display of at least one other terminal apparatus, and an individual display mode, in which the screen information of the meeting material is asynchronously displayed on the display of the terminal apparatus and at least one other terminal apparatus, and that switches operation between the sharing display mode and the individual display mode upon a mode switchover operation by an operator, the terminal apparatus comprising:
   a hardware processor;
   a memory storing program instructions that cause the hardware processor to:
      receive a mode switchover operation between the sharing display mode and the individual display mode by the operator and display the screen information of the meeting material synchronously or asynchronously, in accordance with the mode selected by the mode switchover operation; and
      receive a screen recording operation by the operator and record the screen information of the meeting material as displayed for each of the sharing and individual modes, regardless of whether the screen information of the meeting material is being displayed in the sharing display mode or individual display mode on the display of the terminal apparatus, wherein
      in a case where the hardware processor receives the mode switchover operation to switch from the sharing display mode to the individual mode after receiving the screen recording operation while operating in the sharing display mode, the hardware processor
         continues to receive update information of the screen information of the meeting material to be displayed synchronously from a server,
         stores the received update information of the screen information of the meeting material to be displayed synchronously at the terminal apparatus to update the screen information of the meeting material to be displayed synchronously, even as screen information of the meeting material is displayed asynchronously at the terminal apparatus, and
         inserts chapter information at a time when the screen information of the meeting material to be displayed synchronously is updated; and
      in a case where the screen recording operation for the screen information of the meeting materials to be displayed either synchronously or asynchronously is received by the operator in a meeting, in which at least one agenda is registered, the hardware processor
         records the screen information of the meeting materials to be displayed either synchronously or asynchronously for every unit of an agenda from among the at least one registered agenda.

2. The terminal apparatus according to claim 1, wherein the hardware processor starts recording the screen information of the meeting material to be displayed synchronously when a screen recording operation by the operator is received while the screen information of the meeting material is being displayed synchronously or asynchronously.

3. The terminal apparatus according to claim 2, wherein the hardware processor generates the screen information of the meeting material to be recorded, based on the content and operation information, which is delivered to synchronously display the screen information of the meeting material with the at least one other terminal apparatus in the sharing mode.

4. The terminal apparatus according to claim 3, wherein the hardware processor records a moving image by recording the screen information of the meeting material to be displayed synchronously between a time when the screen information of the meeting material to be displayed in the sharing mode is updated and a subsequent update time.

5. The terminal apparatus according to claim 1, wherein the hardware processor records the screen information of the meeting material to be displayed in the shared mode and the individual mode in a case where a screen recording operation is received from the operator, who can perform the screen recording operation, based on information indicative of the operator.

6. The terminal apparatus according to claim 1,
wherein the hardware processor displays the screen information of the meeting material to be displayed in the shared mode and the individual mode in a case where a display request to display the recorded screen information of the meeting material to be displayed in the shared mode and the individual mode is received from the operator, who can display the screen information of the meeting material to be displayed in the shared mode and the individual mode, based on information indicative of the operator.

7. The terminal apparatus according to claim 1,
wherein the hardware processor displays the recorded screen information of the meeting materials to be displayed asynchronously in a case where a display request to display the screen information of the meeting materials to be displayed asynchronously is received from the operator, who can display the screen information of the meeting materials to be displayed either synchronously or asynchronously, based on information indicative of the operator, who can display the first and second screens.

8. A screen recording method of recording a screen by a terminal apparatus that operates in a sharing display mode, in which screen information of a meeting material is synchronously displayed on a display of the terminal apparatus and a display of at least one other terminal apparatus, and an individual display mode, in which the screen information of the meeting material is asynchronously displayed on the display of the terminal apparatus and at least one other terminal apparatus, and that switches operation between the sharing display mode and the individual display mode upon a mode switchover operation by an operator, the screen recording method comprising:

receiving a mode switchover operation between the sharing display mode and the-individual display mode by the operator and displaying the screen information of the meeting material synchronously or asynchronously, in accordance with the mode selected by the mode switchover operation;

receiving a screen recording operation by the operator and recording the screen information of the meeting material as displayed for each of the sharing display mode or the individual display mode, regardless of whether the screen information of the meeting material is being displayed in the sharing display mode or the individual display mode on the display of the terminal apparatus, wherein in a case where the hardware processor receives the mode switchover operation to switch from the sharing display mode to the individual display mode after receiving the screen recording operation while operating in the sharing display mode, the hardware processor continues to receive update information of the screen information of the meeting material to be displayed synchronously from a server, stores the received update information of the screen information of the meeting material to be displayed synchronously at the terminal apparatus to update the screen information of the meeting material to be displayed synchronously, even as screen information of the meeting material is displayed asynchronously at the terminal apparatus, and inserts chapter information at a time when the screen information of the meeting material to be displayed synchronously is updated; and in a case where the screen recording operation for the screen information of the meeting materials to be displayed either synchronously or asynchronously is received by the operator in a meeting, in which at least one agenda is registered, the hardware processor records the screen information of the meeting materials to be displayed either synchronously or asynchronously for every unit of an agenda from among the at least one registered agenda.

9. A non-transitory computer-readable storage medium storing a program that causes a hardware processor to execute a screen recording method of recording a screen by a terminal apparatus that operates in a sharing display mode, in which screen information of a meeting material is synchronously displayed on a display of the terminal apparatus and a display of at least one other terminal apparatus, and an individual display mode, in which the screen information of the meeting material is asynchronously displayed on the display of the terminal apparatus and at least one other terminal apparatus, and that switches operation between the sharing display mode and the individual display mode upon a mode switchover operation by an operator, the screen recording method comprising:

receiving a mode switchover operation between the sharing display mode and the individual display mode by the operator and displaying the screen information of the meeting material synchronously or asynchronously, in accordance with the mode selected by the mode switchover operation;

receiving a screen recording operation by the operator and recording the screen information of the meeting material as displayed for each of the sharing display mode or the individual display mode, regardless of whether the screen information of the meeting material is being displayed in the sharing display mode or the individual display mode on the display of the terminal apparatus, wherein in a case where the hardware processor receives the mode switchover operation to switch from the sharing display mode to the individual display mode after receiving the screen recording operation while operating in the sharing mode, the hardware processor continues to receive update information of the screen information of the meeting material to be displayed synchronously from a server, stores the received update information of the screen information of the meeting material to be displayed synchronously at the terminal apparatus to update the screen information of the meeting material to be displayed synchronously, even as screen information of the meeting material is displayed asynchronously at the terminal apparatus, and inserts chapter information at a time when the screen information of the meeting material to be displayed synchronously is updated; and in a case where the screen recording operation for the screen information of the meeting materials to be displayed either synchronously or asynchronously is received by the operator in a meeting, in which at least one agenda is registered, the hardware processor records the screen information of the meeting materials to be displayed either synchronously or asynchronously for every unit of an agenda from among the at least one registered agenda.

\* \* \* \* \*